United States Patent [19]

Wakabayashi

[11] Patent Number: 5,539,484
[45] Date of Patent: Jul. 23, 1996

[54] CAMERA FOR USE WITH FILM-USE-STATE INDICATING FILM CARTRIDGE

[75] Inventor: Tsutomu Wakabayashi, Yokohama, Japan

[73] Assignee: Nikon Corporation, Tokyo, Japan

[21] Appl. No.: 487,703

[22] Filed: Jun. 7, 1995

Related U.S. Application Data

[63] Continuation of Ser. No. 288,757, Aug. 11, 1994, abandoned, which is a continuation of Ser. No. 218,844, Mar. 28, 1994, abandoned, which is a continuation of Ser. No. 868,302, Apr. 14, 1992, abandoned.

[30] Foreign Application Priority Data

Apr. 16, 1991 [JP] Japan ..................................... 3-111071

[51] Int. Cl.$^6$ ............................ G03B 1/18; G03B 17/26; G03B 19/02
[52] U.S. Cl. ......................... 354/21; 354/173.1; 354/207; 354/275
[58] Field of Search .......................... 354/21, 106, 173.1, 354/207, 275

[56] References Cited

U.S. PATENT DOCUMENTS

| | | | |
|---|---|---|---|
| 4,832,275 | 5/1989 | Robertson | 354/275 X |
| 4,994,828 | 2/1991 | Smart | 354/21 |
| 4,994,833 | 2/1991 | Cocca | 354/275 X |
| 5,032,854 | 7/1991 | Smart et al. | 354/21 |
| 5,138,350 | 8/1992 | Cocca | 354/21 |
| 5,159,365 | 10/1992 | Takahashi et al. | 354/21 |

FOREIGN PATENT DOCUMENTS

| | | |
|---|---|---|
| 2-136840 | 5/1990 | Japan . |
| 4-76526 | 3/1992 | Japan . |

Primary Examiner—Russell E. Adams
Assistant Examiner—J. K. Han
Attorney, Agent, or Firm—Shapiro and Shapiro

[57] ABSTRACT

A camera of this invention can load a film cartridge, and has a spool around which a film is wound, a case for rotatably storing the spool, and an indicator for discriminatively indicating a use state of a film according to a rotational angular position of the spool. The camera has a spool drive, which can be engaged with the spool of the loaded cartridge at a predetermined rotational angular position, and can rotate the spool upon engagement, a first drive control for controlling the spool drive so as to rotate the spool to an angular position where the indicator indicates a used state of the film after the film is rewound, and an unloading detector for detecting an unloading operation of the film cartridge from the camera. The camera also has a second drive control for controlling the spool drive to assume an angular position where the spool drive can be engaged with the spool of the film cartridge on which a film unused state is indicated after the unloading operation of the film cartridge is detected.

17 Claims, 20 Drawing Sheets

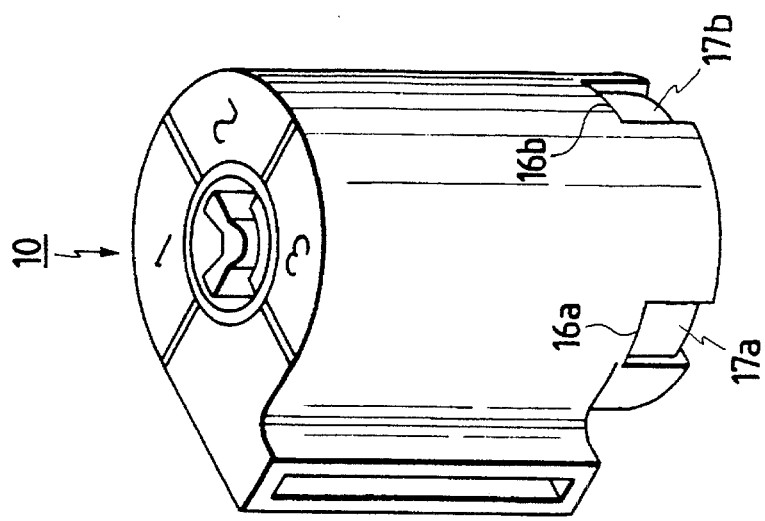
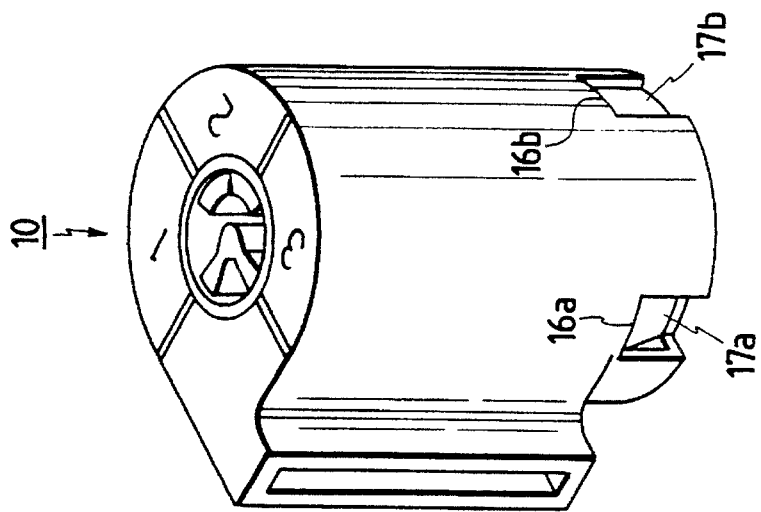
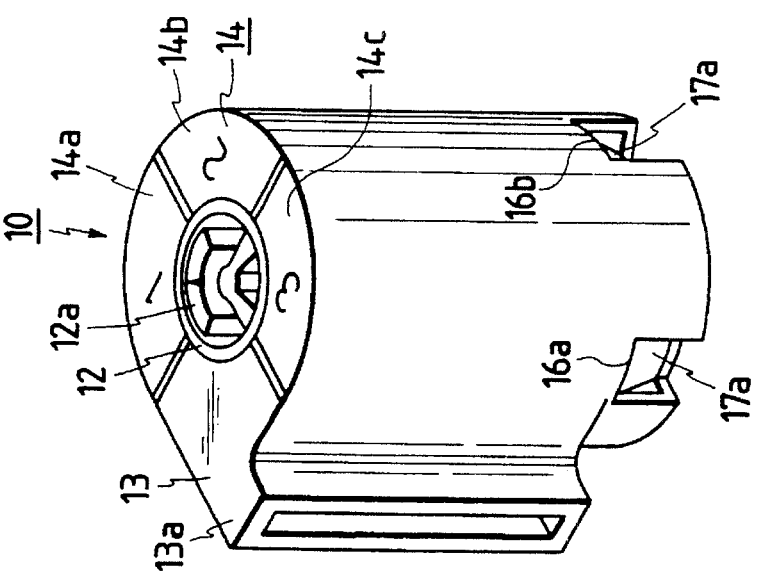

FIG. 10
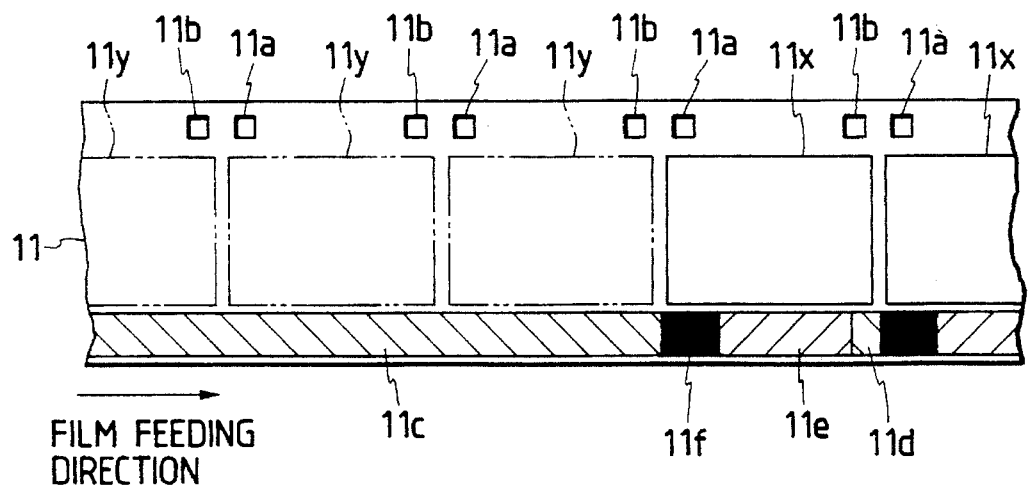
FILM FEEDING DIRECTION
FIG. 11
WAVEFORM OF PERFORATION DETECTION
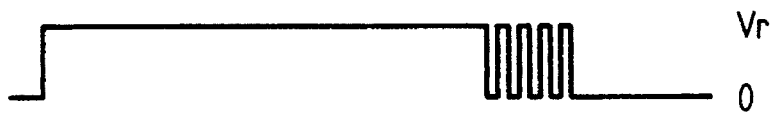
VOLTAGE APPLIED TO FEEDING MOTOR
ROTATION RATE OF FEEDING MOTOR
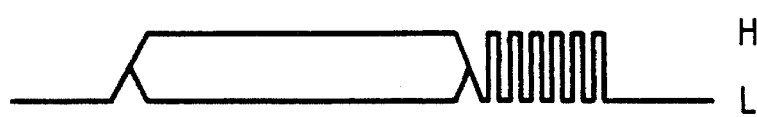
INFORMATION RECORDING SIGNAL

CAMERA FOR USE WITH FILM-USE-STATE INDICATING FILM CARTRIDGE

This is a continuation of application Ser. No. 08/288,757 filed Aug. 11, 1994, which is a continuation of application Ser. No. 08/218,844 filed Mar. 28, 1994, which is a continuation of application Ser. No. 07/868,302 filed Apr. 14, 1992, all of which are now abandoned.

BACKGROUND OF THE INVENTION

1. Field of the Invention

The present invention relates to a camera which loads a film cartridge capable of discriminatively indicating a use state of a film, i.e., an unused film, a partially-used film which is exposed up to an intermediate frame, and is rewound, or a used film which is rewound after all the frames are exposed, in accordance with the rotational angular position of a spool around which a film is wound.

2. Related Background Art

The present assignee previously proposed a camera which uses the above-mentioned film cartridge (Japanese Patent Application No. 2-189994).

This camera comprises a drive member (corresponding to a spool drive means; e.g., a rewinding fork), which can be engaged with the spool of the cartridge at only a predetermined angular position. The spool is rotated by the drive member to rewind a film, and thereafter, is further rotated to indicate the used state of the film (a used film or partially-used film). According to this camera, since an operator can confirm the use state of a film by observing the cartridge, he or she can be prevented from erroneously loading, e.g., a used cartridge in a camera again to perform a photographing operation.

However, the camera disclosed in Japanese Patent Application No. 2-189994 does not drive the drive member to an initial position after a film is rewound and a cartridge is unloaded, and this presents a problem in practice.

Almost all cartridges to be loaded in the camera store unused film (unused cartridges), as a matter of course. On the other hand, most cartridges when unloaded are used or partially-used cartridges, and such states are discriminatively indicated. Therefore, after these cartridges are unloaded, the drive member is located at a rotational position where it can be engaged with a used or partially-used cartridge, but is not located at a position where it can be engaged with an unused cartridge. For this reason, when a cartridge is unloaded, and an unused cartridge is loaded, the spool cannot often be easily engaged with the drive member of the camera, thus making a loading operation difficult.

SUMMARY OF THE INVENTION

It is an object of the present invention to provide a camera, which can easily load an unused film cartridge.

The camera of the present invention can load a film cartridge, which comprises a spool around which a film is wound, a case for rotatably storing the spool, and indication means for discriminatively indicating a used state of the film according to the rotational angular position of the spool. The camera comprises spool drive means which can be engaged with the spool of the loaded film cartridge at a predetermined rotational angular position, and can rotate the spool in an engaging state, first drive control means for controlling the spool drive means to rotate the spool to an angular position where the indication means indicates the used state of the film after the film is rewound, and unloading detection means for detecting that the film cartridge is unloaded from the camera. The camera also comprises second control means, and controls the spool drive means, so that the spool drive means takes an angular position to be able to be engaged with a spool of a film cartridge which indicates a film unused state after it is detected that the film cartridge is unloaded.

In this manner, since a spool drive shaft is controlled to take an angular position so as to be able to be engaged with a spool of a film cartridge which indicates a film unused state, after a film cartridge is unloaded, an unused film cartridge can be easily loaded.

BRIEF DESCRIPTION OF THE DRAWINGS

FIGS. 2A to 2C are perspective views showing a film cartridge used in this embodiment;

FIG. 10 is a view for explaining a magnetic recording state to a film;

FIG. 11 is a timing chart showing signal waveforms of respective units in a magnetic recording state;

DETAILED DESCRIPTION OF THE PREFERRED EMBODIMENT

Figure 1:
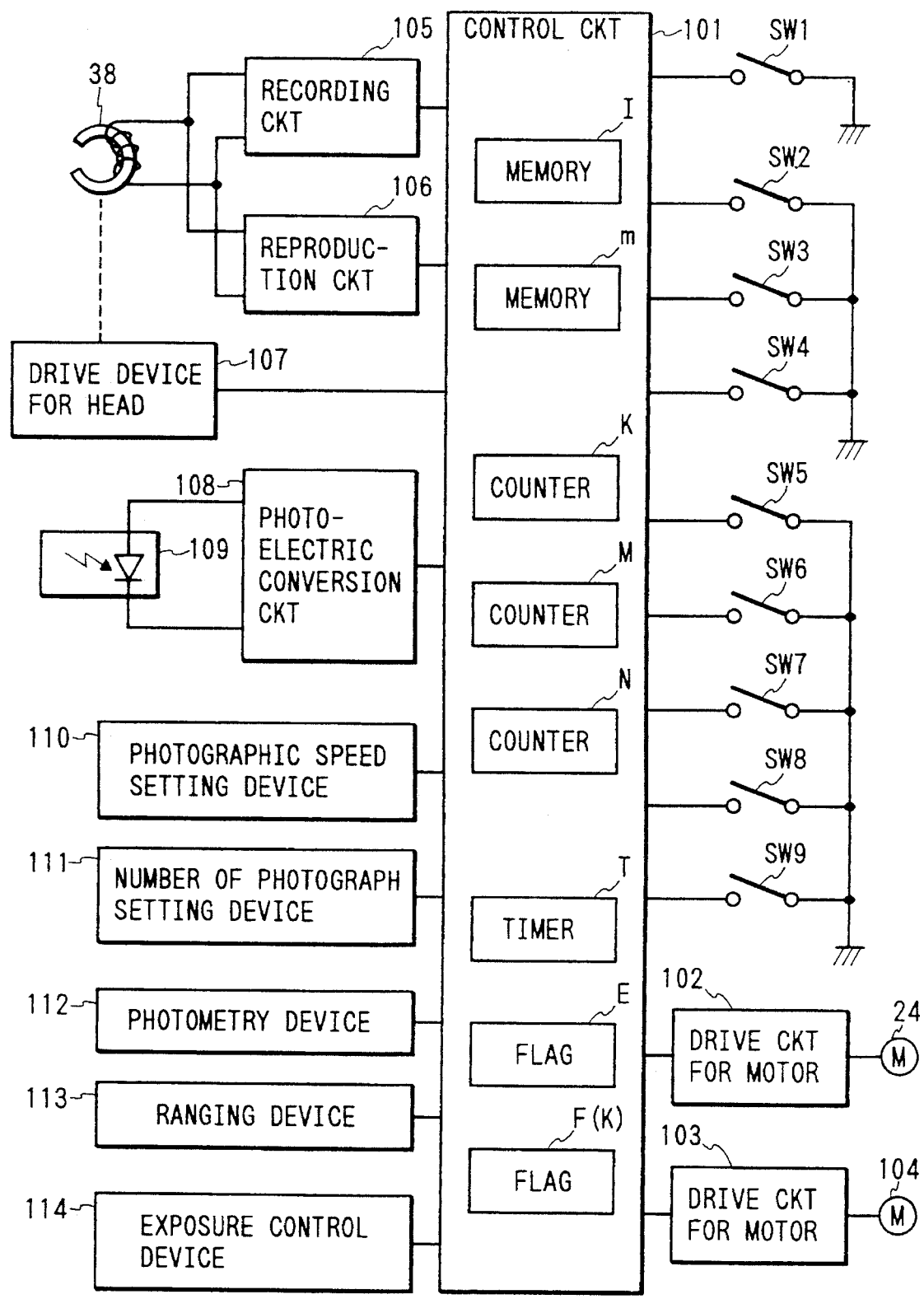
FIG. 1 is a block diagram showing a control system of a camera according to an embodiment of the present invention.

An embodiment of the present invention will be described hereinafter with reference to FIGS. 1 to 24.

FIGS. 2A, 2B, and 2C show a film cartridge for loading in a camera according to the present invention. A cartridge 10 is of the same type as that disclosed in, e.g., U.S. Pat. No. 4,832,275, and comprises a spool 12 around which a film 11 (FIG. 8) is wound, and a case 13 forming a film storage space (not shown). The case 13 has a projecting lip portion 13a. The leading end of the film 11 is stored in the cartridge 10 from the beginning, and the film is fed out or rewound through the lip portion 13a upon rotation of the spool 12.

The cartridge 10 has a mechanism for discriminatively indicating a use state of the film 11, and indicates the use state on a film used state indication portion 14. More specifically, as shown in FIGS. 2A to 2C, the outer periphery of the upper end face of the cartridge 10 is divided into four regions, and indication marks "1" (14a), "2" (14b), and "3" (14c) for indicating the used state of the film in the cartridge 10 are provided on the three regions by, e.g., printing. On the other hand, an index 12a which is rotated according to the movement of the spool 12 is arranged, and indicates one of the indication marks 14a, 14b, and 14c according to the rotation stop position of the spool 12, thereby indicating three used states of the film.

More specifically, when the indication mark "1" (14a) is indicated (FIG. 2A), this represents a totally new unused (unexposed) film; when the indication mark "2" (14b) is indicated (FIG. 2B), this represents a partially-used film which has one or more exposed frames before the last frame when unloaded from the camera; and when the indication mark "3" (14c) is indicated (FIG. 2C), this represents a used (exposed) film which is exposed up to the last frame.

In the embodiment to be described below, when the cartridge is unloaded in a partially-used state, the camera controls the spool 12 to indicate "2" according to the unloading instruction. When a rewinding instruction is output after the film is exposed up to the last frame, the camera controls the spool 12 to indicate "3". Therefore, when a user unloads a film cartridge from the camera, he or she can confirm the use state of the film in the cartridge 10 based on the above-mentioned indication. Note that the indication marks "1" (14a), "2" (14b), and "3" (14c) may be other numerals or symbols such as letters "N (new)", "P (partially used)", and "U (used)".

The cartridge 10 has a mechanism for locking a film use state indicator when the cartridge 10 stands alone, and for allowing movement of the film use state indicator when the cartridge 10 is loaded in the camera like that disclosed in Japanese Patent Application No. 2-189994 of the present assignee. The case 13 is provided with a known DX code, so that the camera can detect a photographic speed, the number of photographable frames, and the like.

Figure 3:
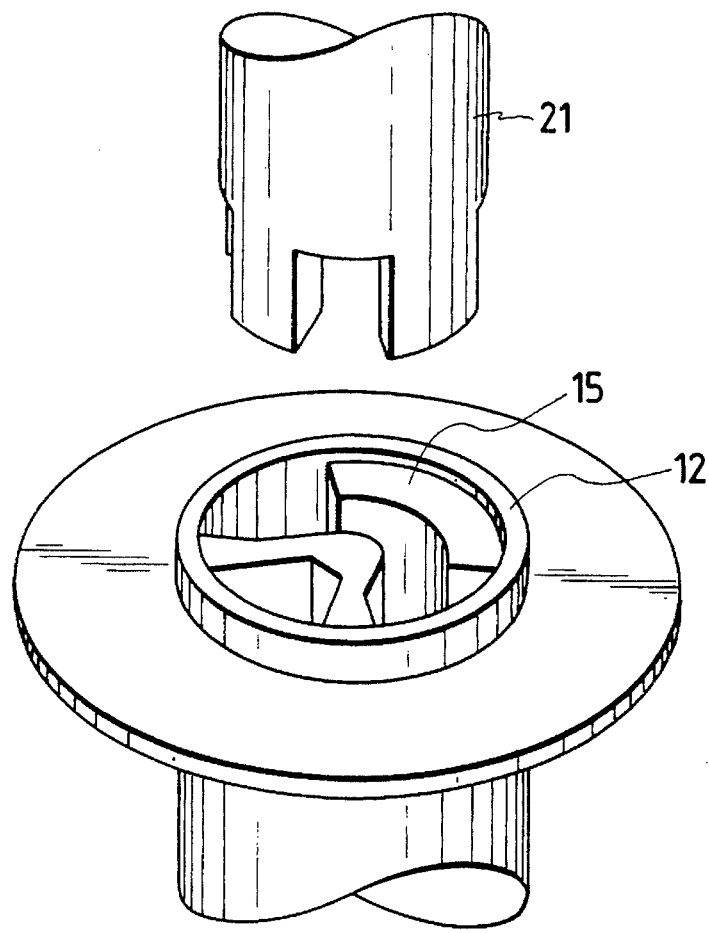
FIG. 3 is a perspective view showing an engaging portion of a cartridge spool and a drive member of the camera.
Figures 4A, 4B:
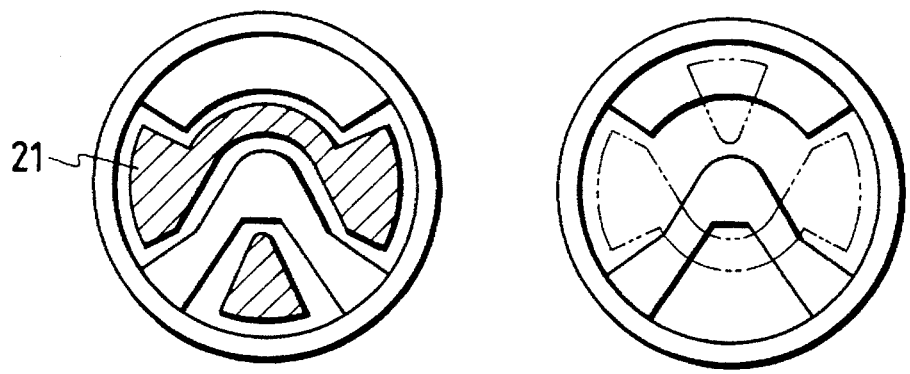
FIGS. 4A and 4B are views for explaining an engaging state between the engaging member and the drive member.

FIG. 3, and FIGS. 4A and 4B show an engaging portion 15 provided to the spool 12 of the film cartridge 10, and a drive member 21 of the camera, which is engaged with the engaging portion 15. This embodiment does not employ spline engagement like in a normal 135 type cartridge, and the engaging portion and the drive member have characteristic shapes, as shown in FIG. 3. The 135 type spline allows engagement at two angular positions (0° and 180°) within 360°, while the structure of this embodiment allows engagement at only the rotational position shown in FIG. 4A, and does not allow engagement at other rotational positions. Such engaging portions 15 are symmetrically formed on the upper and lower ends of the spool 12 to have the same rotational angular position. When the drive member 21 of the camera is engaged with this engaging portion 15, rotation of the spool 12, i.e., the feeding operation of a film, is enabled. FIG. 4B shows a state wherein the engaging portion and the drive member cannot be engaged with each other at a position rotated through 180° from the state shown in FIG. 4A.

The reason why engagement is allowed at only one position within 360° is as follows.

As described above, in this embodiment, when a rewinding operation is completed, the spool 12 is controlled to be stopped at a position according to a film use state (partially-used or used state), and this control is performed by detecting the rotational position of the drive member 21 of the camera. When engagement is allowed at two positions within 360° like in the conventional 135 type spline, if one of the two positions at which engagement is established cannot be identified, the spool 12 cannot be controlled to be stopped at a desired position.

As shown in FIGS. 2A to 2C, two window portions 16a and 16b are formed in the lower portion of the cartridge 10 to be separated by about 90°, and an engaging surface portion 17, which is formed on the lower portion of the spool 12 and is rotated integrally with the spool 12, is exposed from these window portions. The engaging surface portion 17 is defined by an oblique surface 17a and a non-oblique surface 17b, which divide the circumference into halves. The oblique and non-oblique surfaces 17a and 17b are selectively exposed from the window portions 16a and 16b depending on the stop position of the spool 12 (the use state of the film), as follows.

(1) In the state "1", the oblique surface 17a is exposed from both the window portions 16a and 16b.

(2) In the state "2", the oblique surface 17a is exposed from the window portion 16a, and the non-oblique surface 17b is exposed from the window portion 16b.

(3) In the state "3", the non-oblique surface 17b is exposed from both the window portions 16a and 16b.

Figure 5:
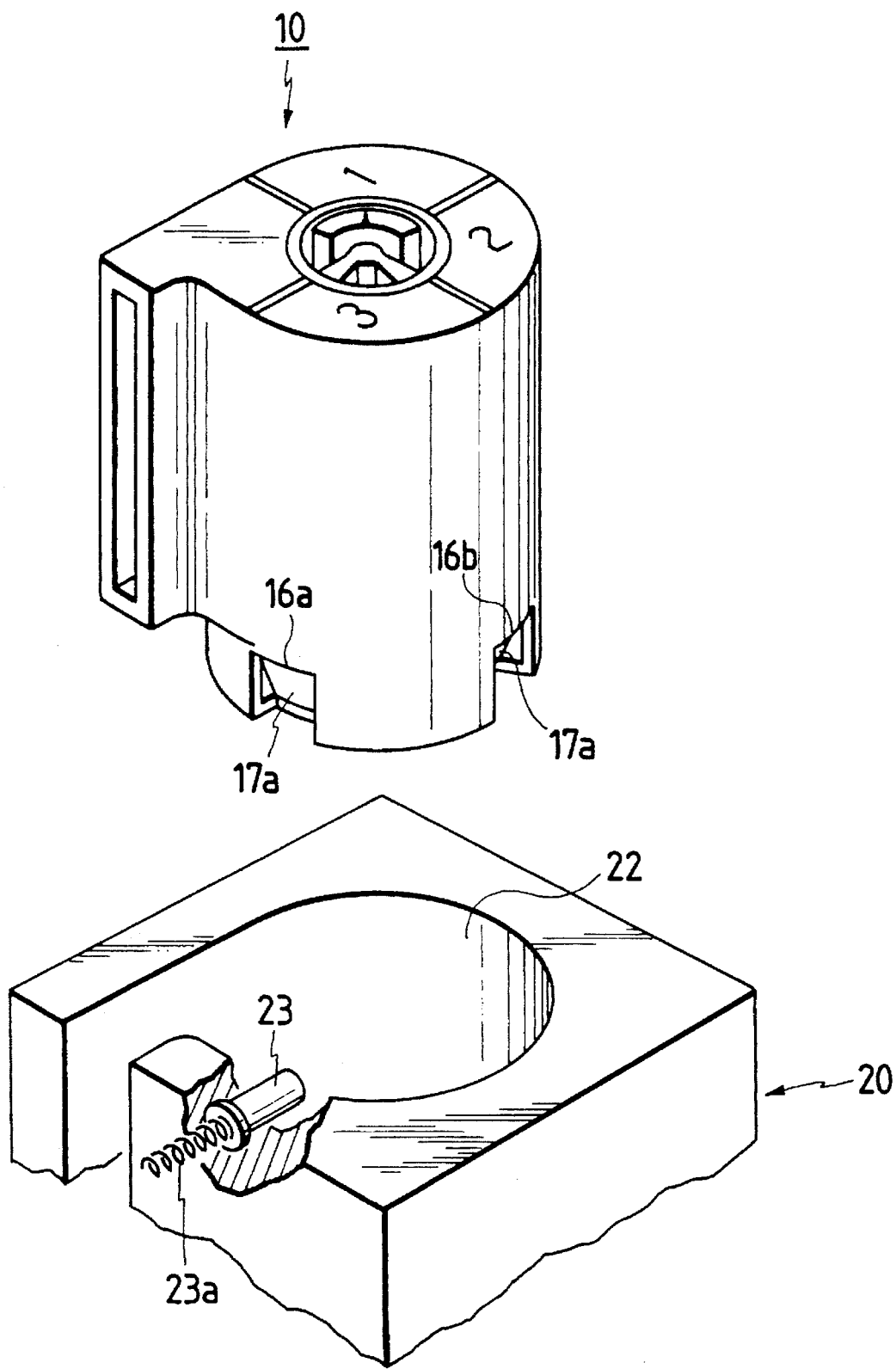
FIG. 5 is a perspective view showing a structure of a cartridge chamber in which a cartridge is loaded.
Figure 6A:
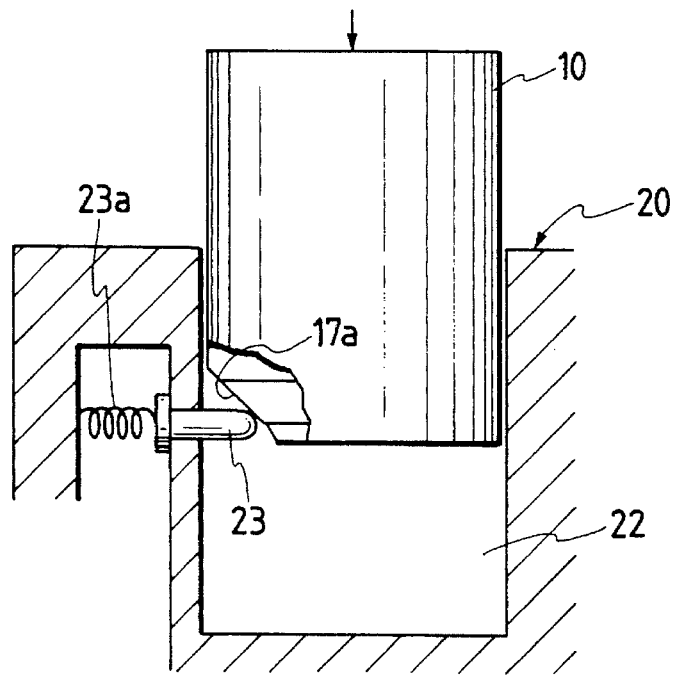
FIGS. 6A and 6B are views for explaining cases wherein the cartridge can be and cannot be loaded in the cartridge chamber.
Figure 6B:
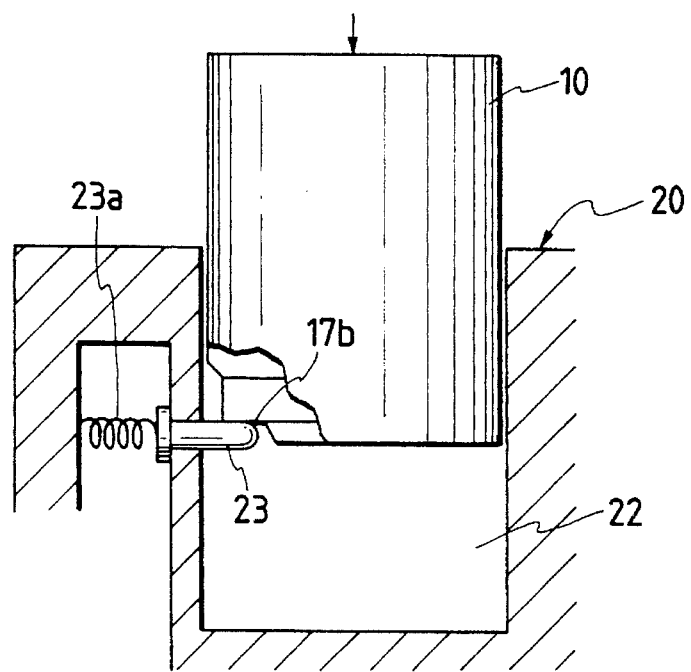

As shown in FIG. 5, in a camera 20, a loading blocking pin 23 biased by a spring 23a retractably in a direction perpendicular to the cartridge loading direction projects from a corresponding portion of a cartridge chamber 22 where the window portion 16a of the film cartridge 10 passes when the cartridge 10 is loaded. Therefore, as shown in FIGS. 6A and 6B, when the oblique surface 17a is exposed from the window portion 16a, the loading blocking pin 23 is retracted by the oblique surface 17a upon insertion of the cartridge 10, and the loading operation of the film cartridge 10 is permitted. When the non-oblique surface 17b is exposed from the window portion 16a, the non-oblique surface 17b abuts against the loading blocking pin 23 upon insertion of the cartridge 10, and the loading operation of the cartridge 10 is mechanically blocked. More specifically, a used cartridge 10 indicated with "3" cannot be loaded in the camera 20, and an unused cartridge 10 indicated with "1" or a partially-used cartridge 10 indicated with "2" can be loaded in the camera 20.

A control mechanism of the camera for controlling the rotation stop position of the cartridge spool 12 will be described below.

Figure 7:
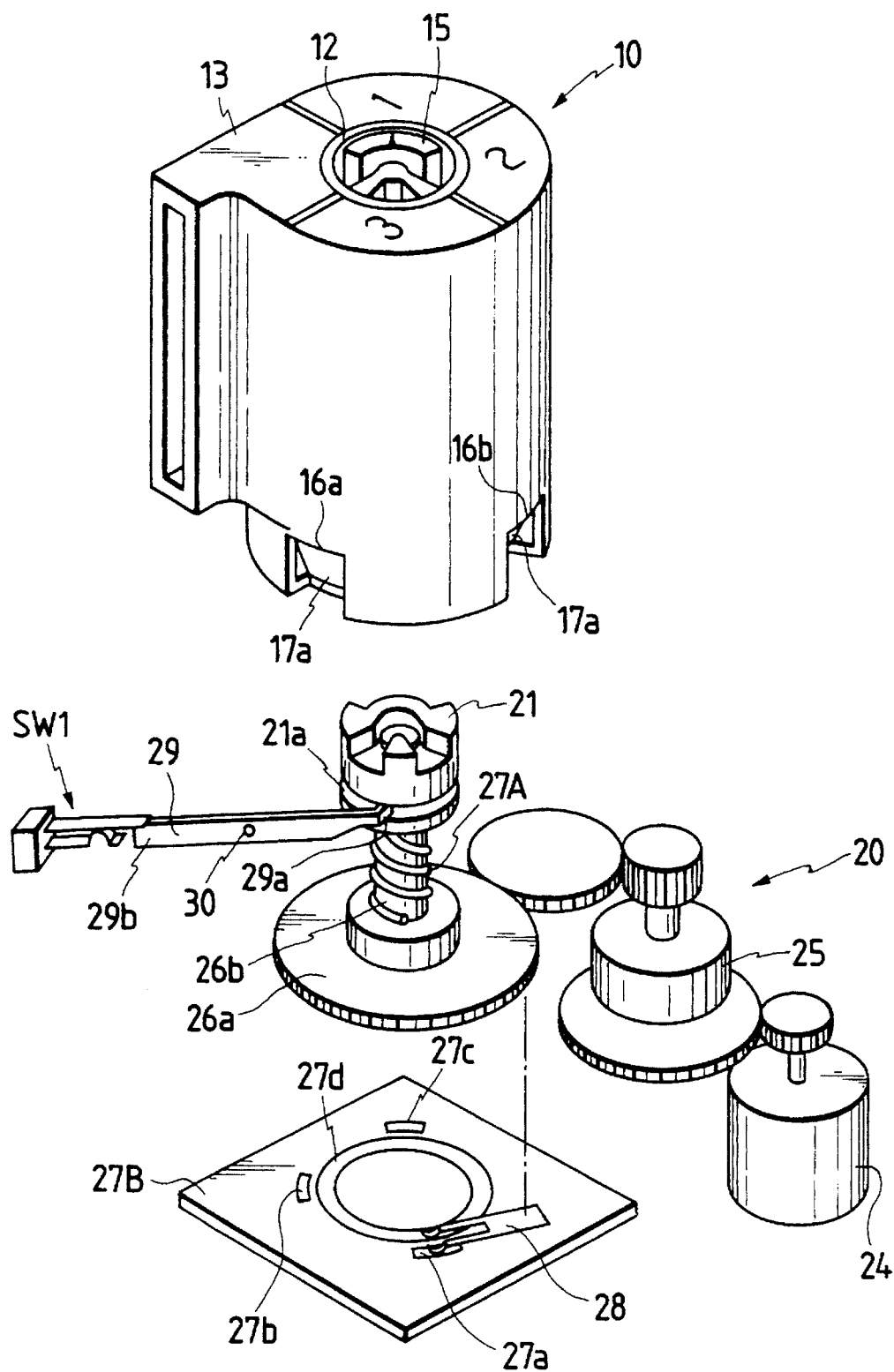
FIG. 7 is a perspective view for explaining a spool drive mechanism, and a discriminative indication state detection mechanism.

As shown in FIG. 7, the drive member 21 of the camera 20 is engaged with the lower engaging portion 15 of the spool 12, and is rotated by a cartridge drive motor 24. More specifically, the rotation of the motor 24 is transmitted to a gear 26a through a reduction gear mechanism 20 having a clutch 25 and gears, and the gear 26a, a shaft 26b, and the drive member 21 are integrally rotated. With this rotation, the spool 12 of the cartridge 10 is rotated, and the film 11 is fed out from or rewound into the cartridge 10.

A spring 27A constitutes a known retractable mechanism which allows a loading operation of the cartridge 10 even when a phase shift occurs between the engaging portion 15 and the drive member 21 upon loading of the cartridge 10. When a phase shift occurs, the drive member 21 is retracted downward along the shaft 26b against the biasing force of the spring 27A. In this manner, even when such a phase shift occurs, the cartridge 10 can be loaded. However, when a phase shift occurs, the cartridge 10 must be loaded against the biasing force of the spring 27A, and the loading operation is made difficult as compared to a case wherein no phase shift occurs. At the retracted position, the drive member 21 can be rotated together with the gear 26a and the shaft 26b. When the film 11 is wound up around a take-up spool 35 (FIG. 9) after the film is fed out upon rotation of the spool 12, the rotation transmission state between the drive member 21 and the cartridge drive motor 24 is disengaged by the clutch 25.

The rotational position of the drive member 21 is detected by conductor patterns 27a, 27b, 27c, and 27d formed on an insulating substrate 27B, and a sliding brush 28. The insulating substrate 27B is fixed in the camera 20. The sliding brush 28 is rotated integrally with the drive member gear 26a, so that one terminal thereof is always in sliding contact with the conductor pattern 27d, and the other terminal thereof can be brought into contact with one of the conductor patterns 27a, 27b, and 27c depending on the rotational position of the drive gear 26a, i.e., the drive member 21. The rotational position of the drive member 21 where the sliding brush 28 is in contact with one of the conductor patterns 27a, 27b, and 27c corresponds to a position where the index 12a of the cartridge 10 indicates one of the indication marks 14a, 14b, and 14c, i.e., "1", "2", and "3". Therefore, when the conductor patterns 27a, 27b, and 27c are connected to the input port of a control circuit 101 (FIG. 1; to be described later), and the conductor pattern 27d is grounded, which one of the conductor patterns 27a, 27b, and 27c the sliding brush 28 contacts can be detected to recognize the rotational position of the drive member 21.

A groove 21a is formed on the lower portion of the drive member 21 over the entire circumference, and is engaged with a distal end 29a of a position detection lever 29, which is pivotally supported by a fixing pin 30. The other end 29b of the lever 29 contacts a segment of a position detection switch SW1. When the drive member 21 is engaged with the engaging portion 15 of the spool 12 of the cartridge 10, and projects up to its upper limit position by the biasing force of the spring 27A, the switch SW1 is turned on. However, when the phase between the drive member 21 and the engaging portion 15 of the spool 12 is shifted, and the drive member 21 is pushed downward, the switch SW1 is turned off. The engaging/disengaging state between the drive member 21 and the engaging portion 15 of the spool 12 can be detected based on an ON/OFF state of the switch SW1.

Figure 8:
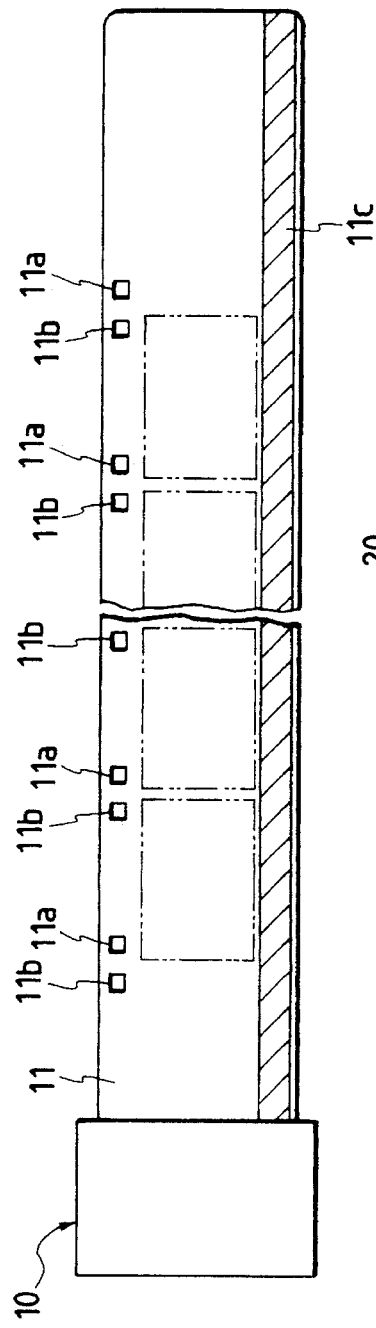
FIG. 8 is a view showing an example of a film.

FIG. 8 shows the film 11 used in the present invention. Two perforations 11a and 11b are formed in the upper portion of the film 11 in correspondence with each photographing frame. In addition, a perforation 11a is formed before the first frame, and a perforation 11b is formed after the last frame. As disclosed in, e.g., Japanese Laid-Open Patent Application No. 2-136840, a magnetic recording region 11c coated with a magnetic recording medium is formed on the lower portion of the film 11. Information associated with a photographing operation is recorded on the magnetic recording region 11c by a magnetic head (to be described later). Information to be recorded includes, e.g., photographing information such as an exposure value in a photographing operation, information for instructing the presence/absence of trimming (trimming information), a photographing date, and the like, and exposure completion information indicating that a corresponding frame is exposed. When the exposure completion information is recorded, double exposure can be prevented when a partially-used film is used again.

Figure 9:
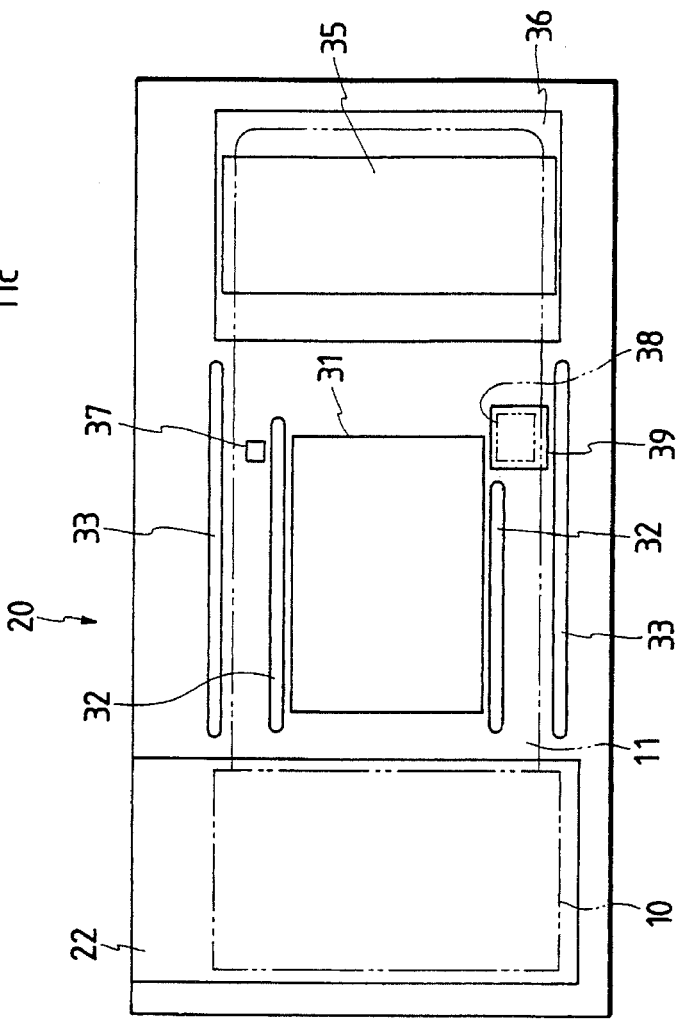
FIG. 9 is a view showing a perforation detection mechanism and a magnetic recording mechanism of the camera.

FIG. 9 is a rear view of the camera, and shows a state wherein the rear surface is removed. The cartridge chamber 22 in which the cartridge 10 is loaded is arranged at one end side of the camera main body, and a spool chamber 36 for storing the film take-up spool 35 is arranged at the other end side. An aperture 31 for forming an exposure opening is formed between these chambers. Inner and outer rails 32 and 33 for forming a film path are arranged above and below the aperture 31.

The film take-up spool 35 is connected to a film feeding motor 104 (FIG. 1) through a reduction gear mechanism (not shown), and is rotated upon rotation of the motor 104. When the film feeding motor 104 is rotated in the normal direction after the film 11 is fed out from the cartridge 10 to the film take-up spool 35, the film 11 is urged against the film take-up spool 35 by a pressure of a film roller (not shown), and is wound up by the film take-up spool 35.

A photoelectric element 37 such as a photoreflector for detecting the perforations 11a and 11b of the film 11 is arranged above the aperture 11. A magnetic head 38 for recording various types of information associated with a photographing operation on the magnetic recording region 11c formed on the film 11 and a pressing pad 39 are arranged below the aperture 11. The film 11 is clamped between the magnetic head 38 and the pressing pad 39 in a tight contact state, so that magnetic recording/reproduction can be properly performed during traveling of the film 11.

A method of recording information on the magnetic recording region 11c on the film 11 will be described below with reference to FIGS. 10 and 11.

When various types of information associated with a photographing operation are recorded on the magnetic recording region 11c of each photographing frame of the film 11, recorded information preferably has a uniform density at any position so as to prevent a reading error in reproduction. However, when the film 11 is wound up by the film feeding motor upon completion of a photographing operation of one frame, even if a voltage is applied to the film feeding motor, as shown in FIG. 11, the rotation rate of the film feeding motor cannot be immediately increased, but is gradually increased. On the other hand, when the film wind-up operation is stopped, the feeding motor is driven in accordance with a predetermined duty cycle to decelerate the feeding motor upon detection of the first perforation 11a, and is braked upon detection of the second perforation 11b. However, the rotation of the feeding motor cannot be immediately stopped. Furthermore, when the film feeding motor is driven in accordance with a predetermined duty cycle, a power supply voltage Vr is repetitively applied to a drive electrode of the film feeding motor at a predetermined duty ratio, thus generating noise. When information is recorded at this time, an error may occur in a recording or reproduction state.

For the above-mentioned reasons, information recording is assigned to only a region 11e where the rotation rate of the film feeding motor becomes constant, as shown in FIG. 10. No recording operation is performed on a region 11d where the rotation rate of the film feeding motor is increased, and a region 11f where the rotation rate of the film feeding motor is decreased is assigned to a region where the exposure completion information is recorded. In this case, as shown in the lowermost chart in FIG. 11, a pulse signal repeating high and low levels is recorded at a frequency higher than that for information recording or at a frequency in a different frequency range.

When the exposure completion information recorded by this recording method is reproduced by the above-mentioned magnetic head 38, if the pulse signal at the frequency higher than a signal frequency for photographing information or in the different frequency range is detected, it can be determined that the corresponding photographing frame is exposed. The pulse signal is not influenced by noise generated when the feeding motor is driven in accordance with a predetermined duty cycle since its information merely repeats high and low levels.

The arrangement of a control system of the camera 20 will be described below with reference to FIG. 1.

The control circuit 101 has a microcomputer, and also has peripheral devices such as memories m and I, counters K, M, and N, a timer T, flags E and F(K), and the like. The control circuit 101 is connected to switches and circuits to be described below, and controls the operation of the camera 20 according to the flow charts to be described later.

The switch SW1 is the above-mentioned position detection switch shown in FIG. 7. A switch SW2 is a switch constituted by the conductor patterns 27a and 27d, and the sliding brush 28, and is turned on when the index 12a of the cartridge 10 indicates "1" representing an unused film. A switch SW3 is a switch constituted by the conductor patterns 27b and 27d, and the sliding brush 28, and is turned on when the index 12a indicates "2" representing a partially-used film. A switch SW4 is a switch constituted by the conductor patterns 27c and 27d, and the sliding brush 28, and is turned on when the index 12a indicates "3" representing a used film.

A switch SW5 is a half-stroke switch, and is turned on when a release button (not shown) is depressed to a half-stroke position. A switch SW6 is a release switch, and is turned on when the release button (not shown) is depressed to a full-stroke position beyond the half-stroke position. A switch SW7 is a lid switch, and is turned on when a cartridge lid (not shown) is opened. A switch SW8 is a cartridge detection switch, and is turned on when a cartridge detection member (not shown) detects that the cartridge 10 is loaded in the cartridge chamber 22. A switch SW9 is a partial rewinding switch, which is turned on upon depression of a partial rewinding button (not shown). The switch SW9 is turned on when the film is rewound before all the films are exposed.

A motor drive circuit 102 drives the above-mentioned cartridge drive motor 24 to feed out or rewind the film. When the cartridge drive motor 24 is driven in the normal direction, a film feeding out operation is performed; when it is rotated in the reverse direction, a film rewinding operation is performed. A motor drive circuit 103 drives the film feeding motor 104 in the normal direction to drive the film take-up spool 35, thereby winding up the film. A recording circuit 105 records the above-mentioned various types of information on the magnetic recording region 11c on the film 11 through the magnetic head 38 connected thereto. A reproduction circuit 106 reproduces various types of information recorded on the magnetic recording region 11c on the film 11 through the magnetic head 38 connected thereto.

A magnetic head drive device 107 drives the magnetic head 38 forward/backward with respect to the surface of the film 11, so that the magnetic head 38 can contact the magnetic recording region 11c on the film 11 only when information is recorded on the magnetic recording region 11c on the film 11, and when information recorded on the magnetic recording region 11c on the film 11 is reproduced. A photoelectric conversion circuit 108 causes a photoelectric element 109 such as a photoreflector connected thereto to detect the presence/absence of the film 11 and the perforations 11a and 11b on the film 11. A perforation detection signal is used in a counting operation of the number of fed frames of a film, and in an operation for aligning a photographing frame position.

A photographic speed setting device 110 detects photographic speed information from the DX code on the cartridge 10, and outputs this information as a photographic speed signal. A number of photograph setting device 111 similarly detects information about the number of frames of a film from the DX code, and outputs this information as a number of frame signal. A photometry device 112 detects the object brightness in a photographing frame, and outputs the object brightness as an object brightness signal. A ranging device 113 measures a distance to an object, and outputs the measured value as a ranging signal. An exposure control device 114 controls a shutter mechanism section and an aperture section (neither are shown).

The control sequence of the control circuit 101 will be described below with reference to the flow charts shown in FIGS. 12 to 24.

Figure 12:
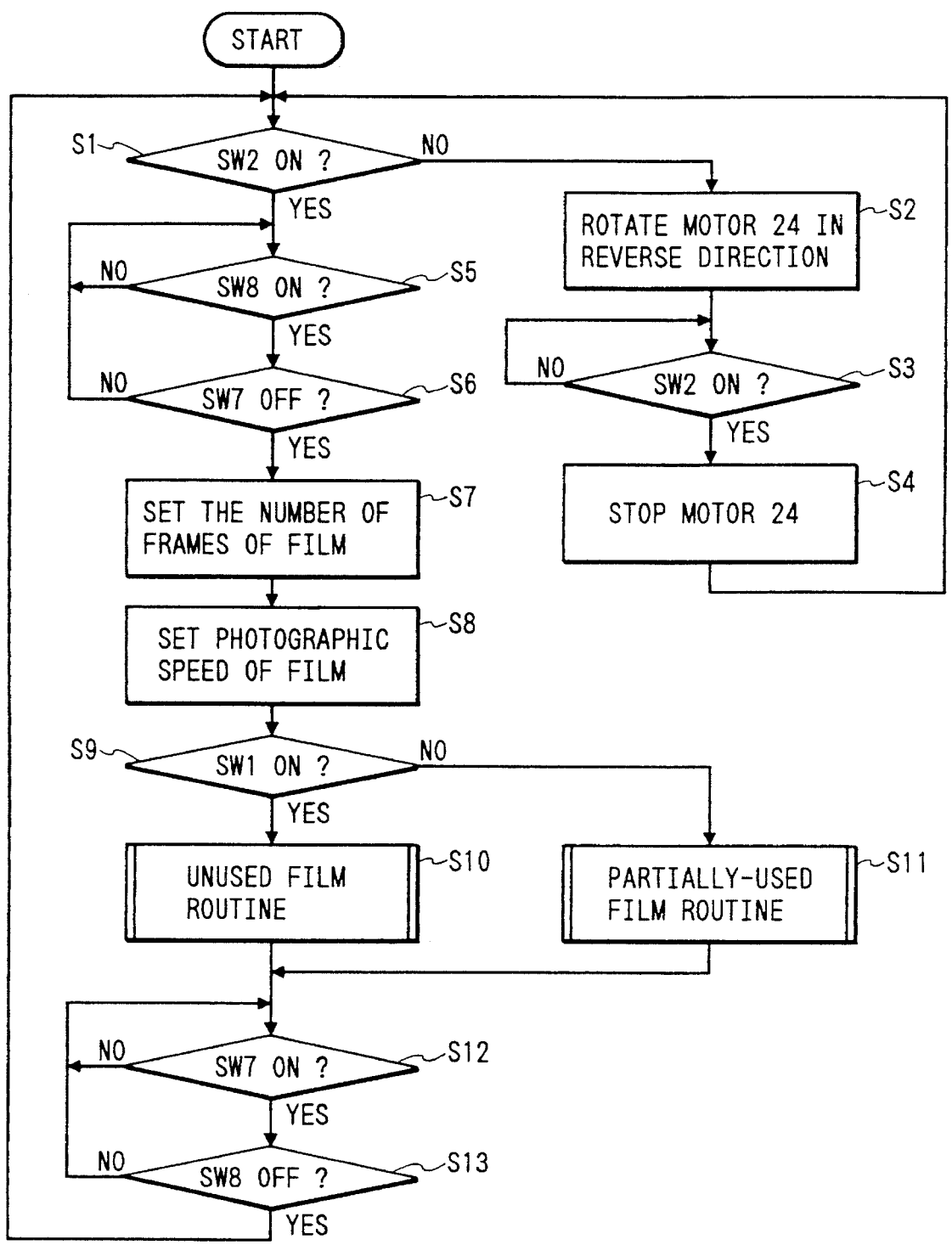
FIG. 12 is a main flow chart executed by a control circuit of the camera.

FIG. 12 shows the main program, and FIGS. 13 to 24 shows the subroutine programs.

When a battery (not shown) is inserted in the camera 20, the main program shown in FIG. 12 is started. In step S1, it is checked if the switch SW2 constituted by the conductor patterns 27a and 27d, and the sliding brush 28 in FIG. 7 is ON, i.e., if the engaging portion 15 of the spool 12 of the cartridge 10 indicated with "1" can be engaged with the drive member 21 of the camera. If it is determined that the switch SW2 is OFF (engagement is disabled), the flow advances to step S2; if it is determined that the switch SW2 is ON (engagement is enabled), the flow advances to step S5.

In step S2, the cartridge drive motor 24 begins to be rotated in the reverse direction (film rewinding direction). In step S3, the control waits until the above-mentioned switch SW2 is turned on, i.e., until the drive member 21 of the camera is driven to a position where it can be engaged with the engaging portion 15 of the spool 12 of the cartridge 10 indicated with "1". Thereafter, in step S4, the reverse rotation of the cartridge drive motor 24 is stopped, and the flow then returns to step S1.

In step S5, it is checked based on the ON/OFF state of the cartridge detection switch SW8 if the cartridge 10 is loaded in the cartridge chamber 22. If the switch SW8 is OFF, it is determined that no cartridge is loaded, and the flow stays in step S5; if the switch SW8 is ON, it is determined that the cartridge is loaded, and the flow advances to step S6. It is checked in step S6 based on an ON/OFF state of the lid switch SW7 if the cartridge lid (not shown) is open. If the switch SW7 is ON, it is determined that the cartridge lid is open, and the flow returns to step S5; if the switch SW7 is OFF, it is determined that the cartridge lid is closed, and the flow advances to step S7. In step S7, information about the number of frames of a film recorded on the DX code on the cartridge 10 is detected through the number of photograph setting device 111, and the detected number of frames is stored in the memory I. In step S8, photographic speed information of a film recorded on the DX code is detected through the photographic speed setting device 110, and the photographic speed is stored in the memory m.

In step S9, it is checked based on an ON/OFF state of the position detection switch SW1 if "1" or "2" is indicated on the cartridge 10 loaded in the cartridge chamber 22. As has already been described above with reference to FIG. 6, since the loading operation of the used cartridge 10 indicated with "3" into the cartridge chamber 22 is blocked, the currently loaded cartridge 10 is either an unused cartridge indicated with "1" or a partially-used cartridge indicated with "2". Since the position of the drive member 21 of the camera is already adjusted in steps S1 to S4 described above, when the cartridge 10 indicated with "1" is loaded, the engaging portion of the spool 12 is engaged with the drive member 21 simultaneously with the loading operation, and since the drive member 21 is not retracted downward, the position detection switch SW1 is turned on. On the other hand, when the cartridge indicated with "2" is loaded, the engaging portion of the spool 12 is not engaged with the drive member 21, and the drive member 21 is retracted, thus turning off the position detection switch SW1. Therefore, when the position detection switch SW1 is ON, the flow advances to an unused film routine in step S10; otherwise, the flow advances to a partially-used film routine in step S11.

Figure 13:
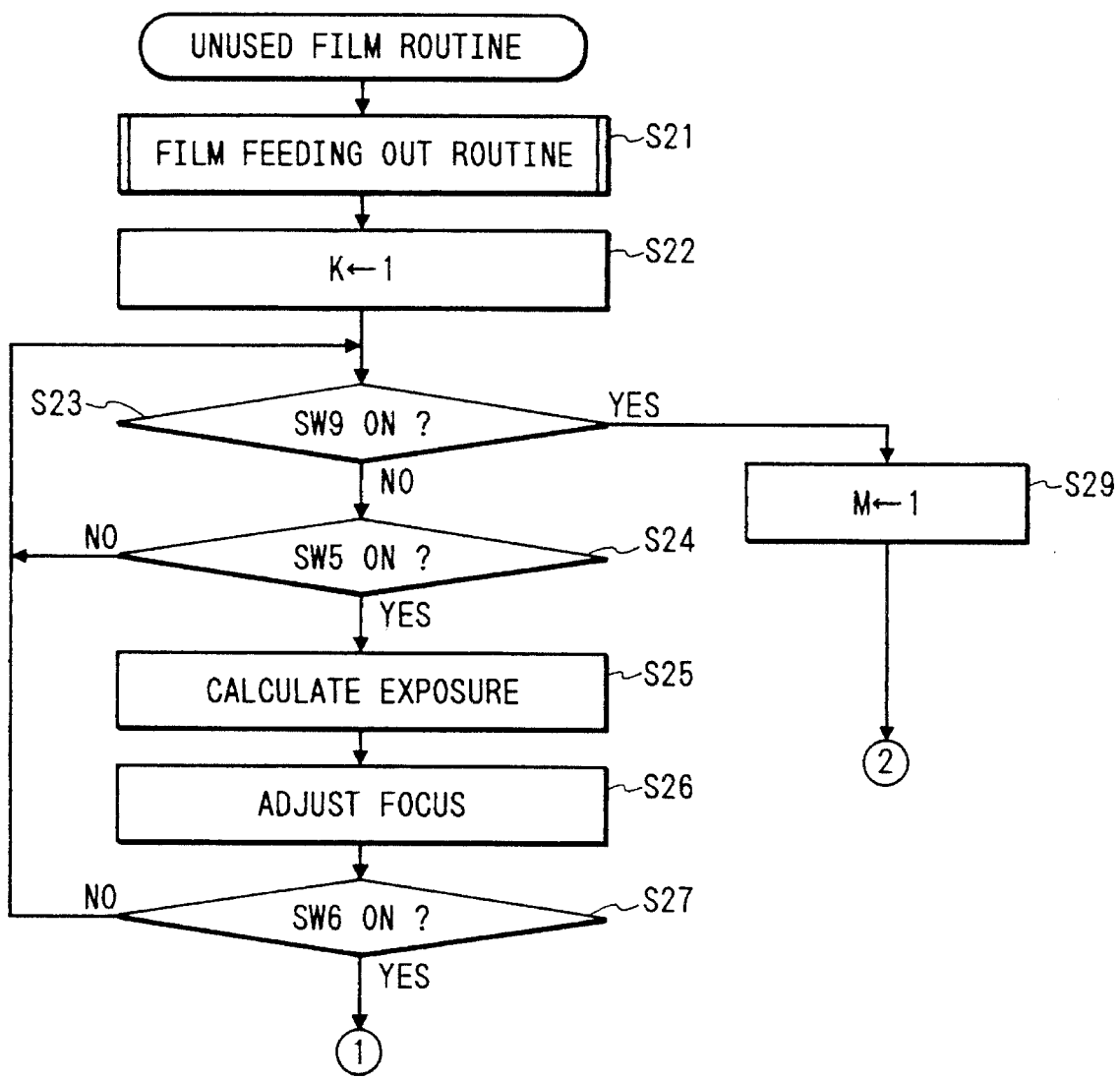
FIG. 13 is a subroutine flow chart showing in detail an unused film routine.
Figure 14:
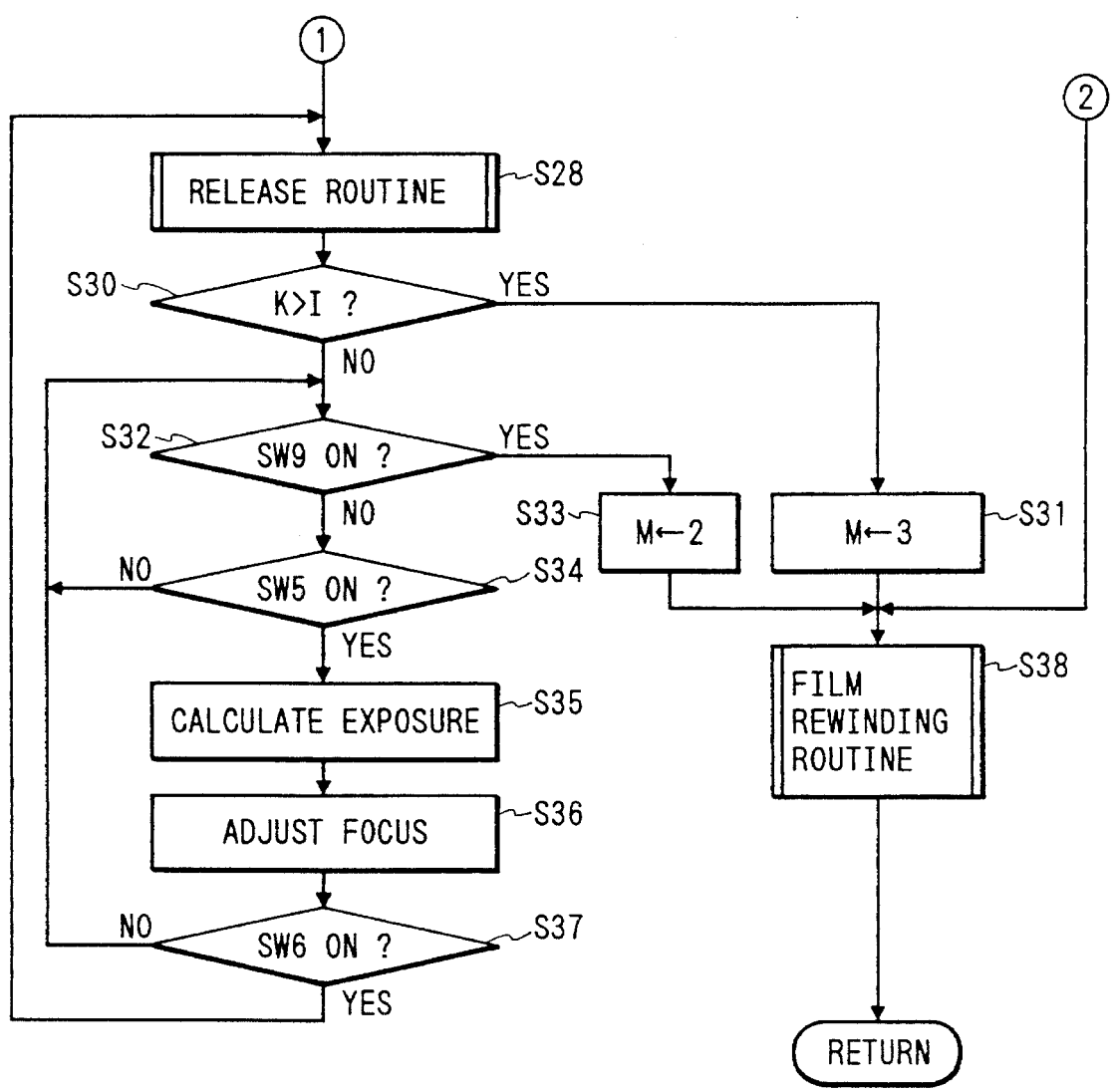
FIG. 14 is a flow chart following FIG. 13.

Step S10 corresponds to a portion for performing the operation of the camera for an unused film, and is shown in detail in FIGS. 13 and 14.

In step S21 in FIG. 13, an operation for feeding out the film 11 from the cartridge 10 to a position outside the cartridge 10 is performed. This operation will be described in detail below with reference to FIG. 15.

Figure 15:
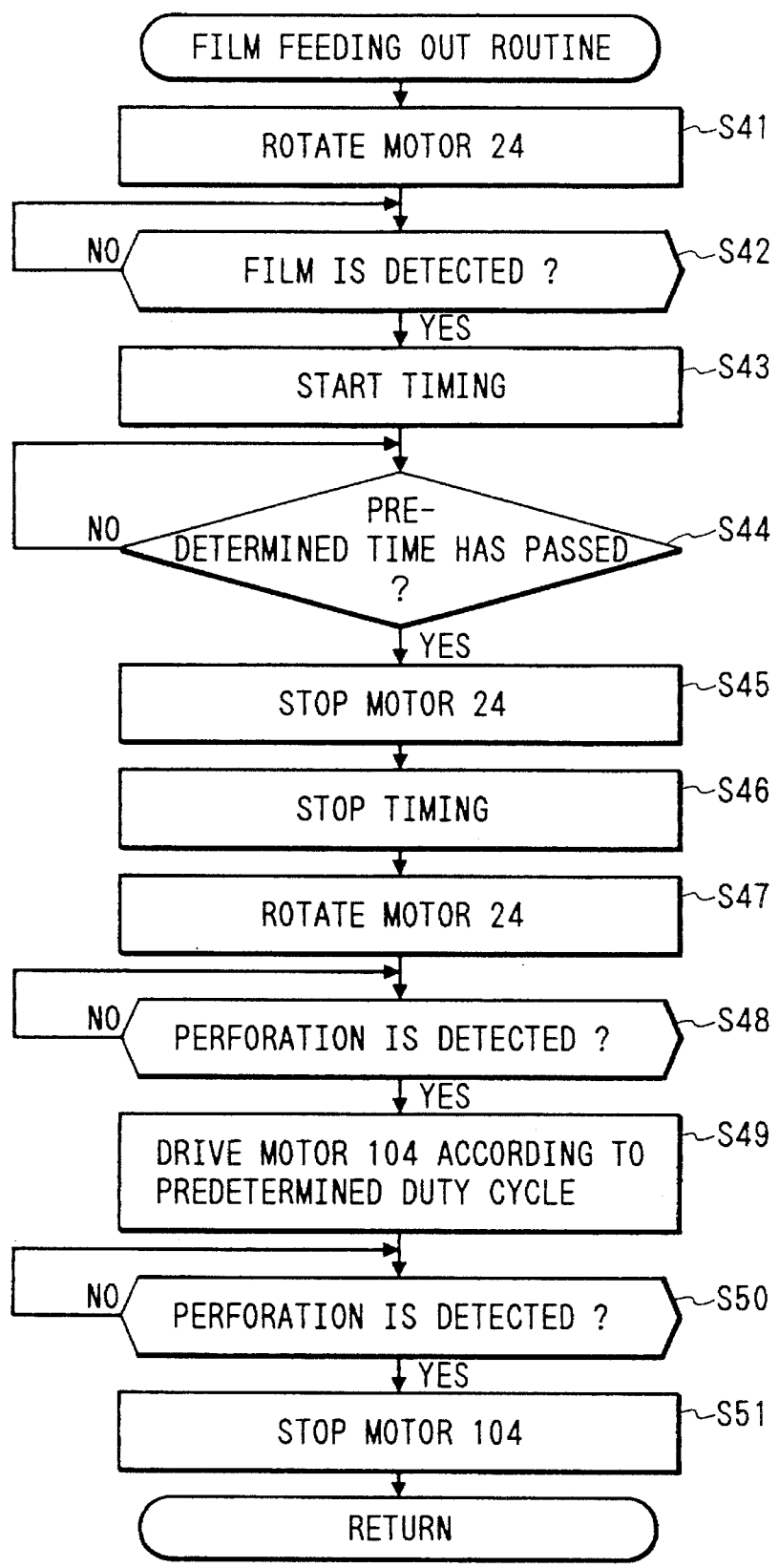
FIG. 15 is a subroutine flow chart showing in detail a film feeding out routine.

In step S41 in FIG. 15, the cartridge drive motor 24 begins to be rotated in the normal direction to feed out the film 11 from the cartridge 10. More specifically, when the motor 24 is rotated in the normal direction, its rotation is transmitted to the gear 26a through the reduction gear mechanism 20, and the gear 26a, the shaft 26b, and the drive member 21 are rotated in a predetermined direction. Upon rotation of the drive member 21, the spool 12 of the cartridge 10, which is engaged with the drive member 21 is rotated in the same direction, and the film 11 wound around the spool 12 is fed out from the cartridge 10.

In step S42, the control waits until the film 11 is detected by the photoelectric element 109 through the photoelectric conversion circuit 108, i.e., until the film 11 reaches the position of the photoelectric element 109. When the film 11 is detected, the flow advances to step S43. In step S43, the timer T is driven to start timing of a predetermined period of time slightly longer than a time required until the leading end of the film 11 passes the photoelectric element 109 and reaches the film take-up spool 35. In step S44, the control waits until the predetermined period of time passes, i.e., the timer T reaches a time-up state. When the timer T reaches the time-up state, the flow advances to step S45. In step S45, the normal rotation of the cartridge drive motor 24 is stopped, thereby stopping the feeding out operation of the film 11 from the cartridge 10.

In step S46, the timing operation of the timer T is stopped. In step S47, the normal rotation of the film feeding motor 104 is started to start a wind-up operation of the film 11 by the film take-up spool 35. More specifically, since the film 11 fed out from the cartridge 10 has reached the take-up spool 35, the take-up spool 35 is rotated to wind up the film 11. In step S48, the control waits until the perforation 11a is detected by the photoelectric element 109 through the photoelectric conversion circuit 108. When the perforation 11a is detected, the flow advances to step S49.

In step S49, the film feeding motor 104 begins to be driven in accordance with a predetermined duty cycle so as to decelerate the film 11, so that the aperture 31 is precisely aligned with the perforation 11b of a frame to be exposed. The drive operation according to the duty cycle has been described above. In step S50, the control waits until the perforation 11b is detected by the photoelectric element 109 through the photoelectric conversion circuit 108. If the perforation 11b is detected, the flow advances to step S51. In step S51, the drive operation of the film feeding motor 104 according to the duty cycle is stopped to stop the wind-up operation of the film 11. Thereafter, the flow returns to the routine shown in FIG. 13.

In step S22 in FIG. 13, 1 is set in the counter K. The counter K indicates the frame number of the film 11. In step S23, it is checked if the partial rewinding switch SW9 is ON, i.e., if the partial rewinding button (not shown) is depressed to instruct a partial rewinding operation. If it is determined that the partial rewinding switch SW9 is ON (the partial rewinding operation is instructed), the flow advances to step S29; otherwise, the flow advances to step S24. In step S24, it is checked if the half-stroke switch SW5 is ON, i.e., if the release button (not shown) is depressed to the half-stroke position. If it is determined that the switch SW5 is ON, the flow advances to step S25; otherwise, the flow returns to step S23.

In step S25, an exposure calculation for calculating a shutter speed and an aperture value on the basis of an object brightness detected by the photometry device 112 and the photographic speed stored in the memory m in step S8 described above in a predetermined exposure control mode is performed, and the calculated shutter speed and aperture value are stored in the memory m. In step S26, an object distance is measured by the ranging device 113, and a photographing lens (not shown) is driven to an in-focus position. In step S27, it is checked if the release switch SW6 is ON, i.e., if the release button (not shown) is depressed to the full-stroke position. If it is determined that the release switch SW6 is ON, the flow advances to step S28 in FIG. 14; otherwise, the flow returns to step S23.

Figure 16:
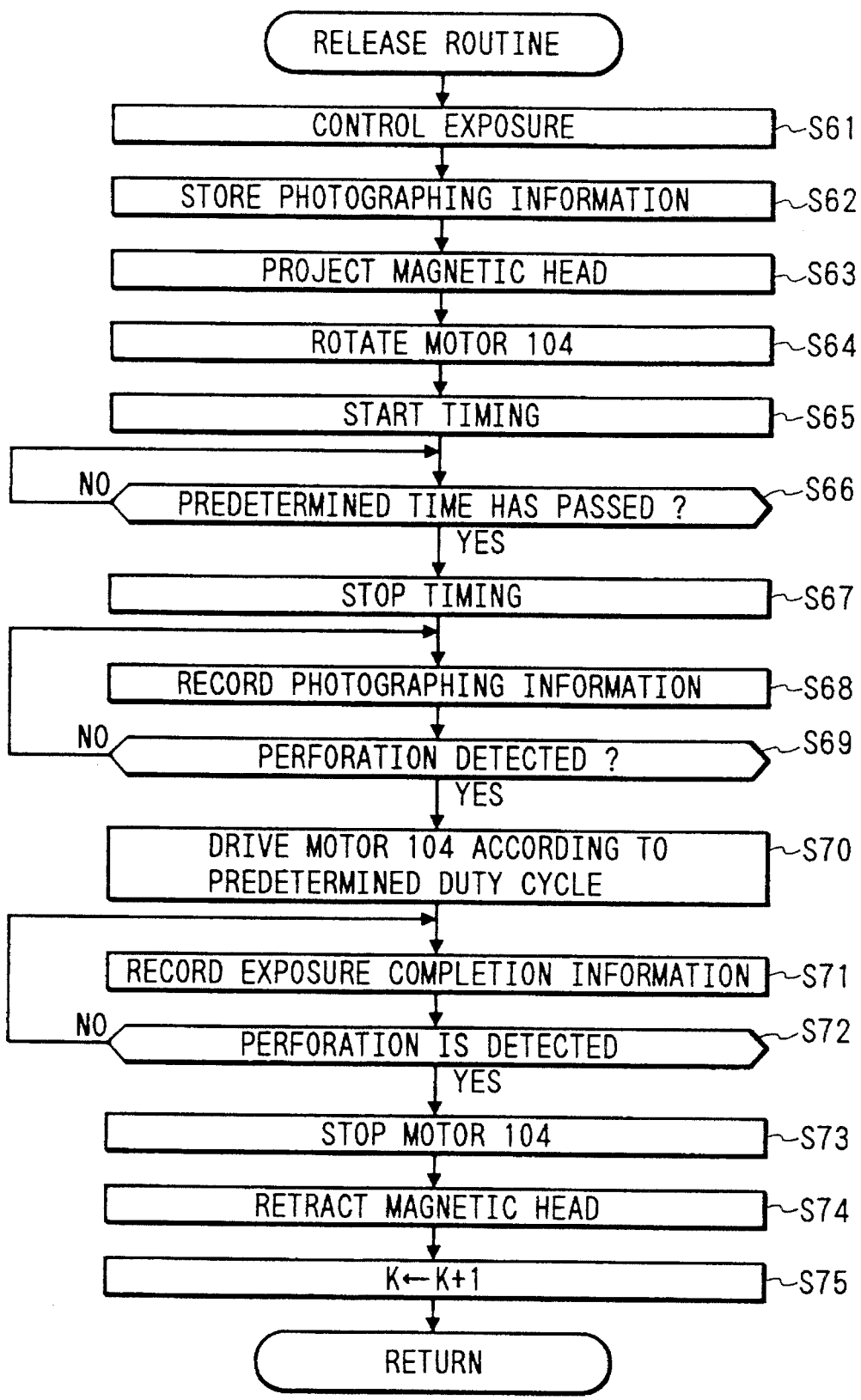
FIG. 16 is a subroutine flow chart showing in detail a release routine.

Step S28 is a release routine showing a photographing operation, and FIG. 16 shows this routine in detail. In step S61, the shutter mechanism section and the aperture mechanism section of the exposure control device 114 are controlled according to the photographic speed and aperture value stored in the memory m, thus performing a photographing operation (exposure control). In step S62, photographing information associated with a photographing operation such as an exposure value, trimming information, a photographing date and the like of the photographing operation executed in step S61, and the exposure completion information indicating that exposure is completed, are stored in the memory m. In step S63, the magnetic head drive device 107 drives the magnetic head 38 to project and press it against the magnetic recording region 11c on the film surface. In step S64, the normal rotation of the film feeding motor 104 is started to rotate the film take-up spool 35, thereby starting the wind-up operation of the film 11.

In step S65, the timer T is driven to begin to measure a predetermined period of time required until the wind-up speed of the film 11 by the film feeding motor 104 becomes almost constant. In step S66, the control waits until the predetermined period of time passes, i.e., the timer T reaches a time-up state, and the wind-up speed of the film 11 becomes almost constant. When the timer T reaches the time-up state, the flow advances to step S67. In step S67, the timing operation of the timer T is stopped. In step S68, the photographing information (photographing information associated with a photographing operation such as the exposure value, trimming information, photographing date, and the like in the photographing operation) stored in the memory m in step S62 is read out, and is recorded on the magnetic recording region 11c on the film 11 through the recording circuit 105 and the magnetic head 38.

In step S69, it is checked if the perforation 11a is detected by the photoelectric element 109 through the photoelectric conversion circuit 108. If YES in step S69, the flow advances to step S70; otherwise, the flow returns to step S68 to continue the recording operation of the photographing information. In step S70, the film feeding motor 104 is driven in accordance with the predetermined duty cycle to decelerate the film 11 so as to precisely align the aperture 31 with the perforation 11b of the photographing frame.

In step S71, the exposure completion information, which repeats high and low levels to prevent a recording error of information, and is stored in the memory m in step S62, is read out, and is recorded on the magnetic recording region 11c on the film 11 through the recording circuit 105 and the magnetic head 38. In step S72, it is checked if the perforation 11b is detected by the photoelectric element 109 through the photoelectric conversion circuit 108. If YES in step S72, the flow advances to step S73; otherwise, the flow returns to step S71 to continue the recording operation of the exposure completion information.

In step S73, the drive operation of the film feeding motor 104 according to the predetermined duty cycle is stopped, thereby stopping the wind-up operation of the film 11. In step S74, the pressing operation of the magnetic head 38 against the surface of the film 11 by the magnetic head drive device 107 is released to retract the magnetic head 38 from the film 11. In step S75, the content of the counter K is incremented by one, and the flow returns to the unused film routine shown in FIG. 14.

With the processing shown in FIG. 16, a photographing operation can be performed, and various types of photographing information associated with a given photographing frame, and exposure completion information is recorded on the magnetic recording region 11c on the film 11 in correspondence with the wind-up operation of the frame.

In step S30 in FIG. 14, the counter K is compared with the memory I, i.e., the frame number is compared with the number of frames of the film. If the frame number is larger than the number of frames of the film, it is determined that the film 11 has become a used film, and the flow advances to step S31; otherwise, the flow advances to step S32. In step S31, "3" is set in the counter M to designate a used film, and the flow advances to step S38. The counter M designates the used state of the film cartridge 10: "1" corresponds to an unused film, "2" corresponds to a partially-used film, and "3" corresponds to a used film.

In step S32, it is checked based on an ON/OFF state of the partial rewinding switch SW9 if the partial rewinding operation is instructed. If it is determined that the partial rewinding switch SW9 is ON to instruct the partial rewinding operation, the flow advances to step S33; otherwise, the flow advances to step S34. In step S33, "2" is set in the counter M to designate a partially-used film, and the flow advances to step S38.

In step S34, the ON/OFF state of the half-stroke switch SW5 is checked like in step S24. If the switch SW5 is ON, the flow advances to step S35; otherwise, the flow returns to step S32. In step S35, an exposure calculation is performed, and the calculated photographic speed and aperture value are stored in the memory m like in step S25. In step S36, an object distance is measured, and the photographing lens (not shown) is driven to attain an in-focus state like in step S27. In step S37, the ON/OFF state of the release switch SW6 is checked like in step S27. If the switch SW6 is ON, the flow returns to the release routine in step S28; otherwise, the flow returns to step S32.

If it is determined in step S23 in FIG. 13 that the switch SW9 is ON to instruct the partial rewinding operation, the flow advances to step S29. In step S29, "1" is set in the counter M, and the flow advances to step S38. More specifically, YES is determined in step S23 when the partial rewinding operation is instructed for an unused film, i.e., before any frames are exposed. In this case, "1" is set in the counter M.

Figure 17:
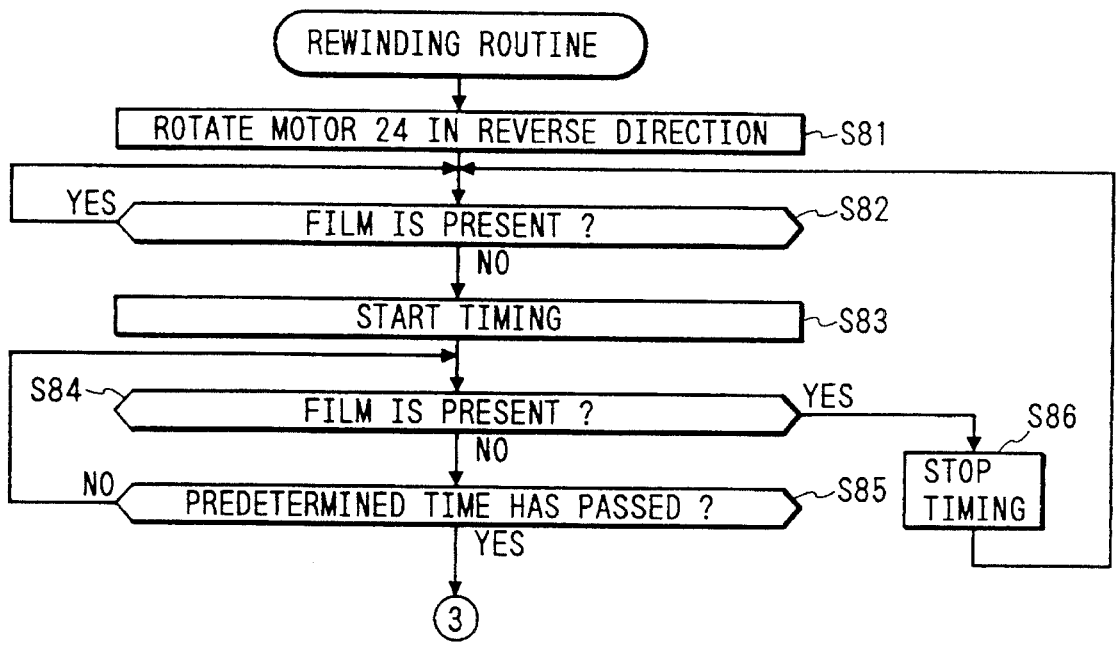
FIG. 17 is a subroutine flow chart showing in detail a rewinding routine.
Figure 18:
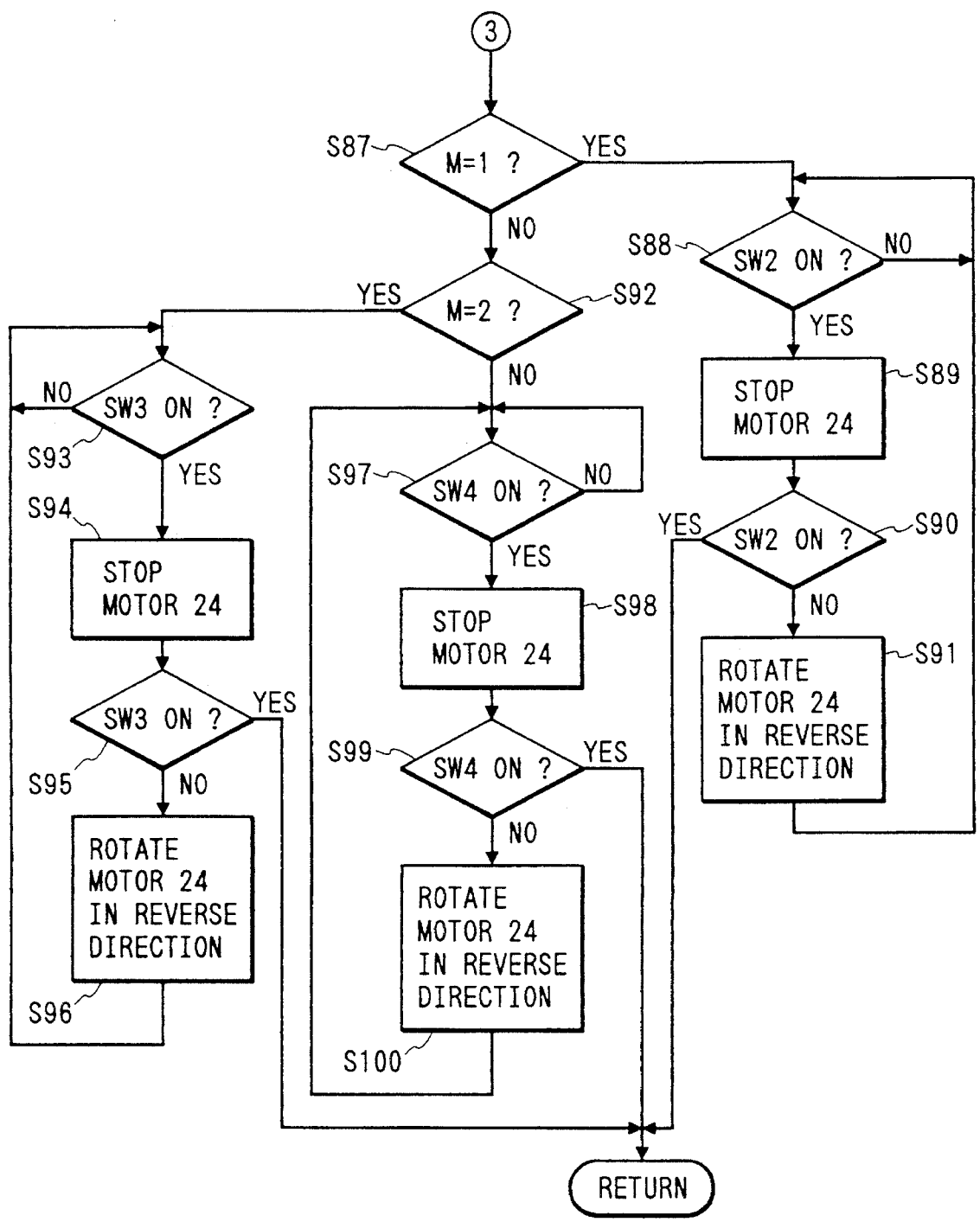
FIG. 18 is a flow chart following FIG. 17.

In step S38, a numerical value is set in the counter M in step S29, S31, or S33, and processing for rewinding the film 11 into the film cartridge 10 is performed. FIGS. 17 and 18 show the film rewinding processing in detail.

In step S81 in FIG. 17, the reverse rotation of the cartridge drive motor 24 is started to start the rewinding operation of the film 11 into the film cartridge 10. In step S82, the presence/absence of the film 11 is checked by the photoelectric element 109 through the photoelectric conversion circuit 108. If the presence of the film 11 is detected, the control stays in step S82; otherwise, the flow advances to step S83. In step S83, the timer T is driven to start measurement of a predetermined period of time slightly longer than a time required until the leading end of the film 11 passes the photoelectric element 109 and is reliably rewound into the film cartridge 10.

In step S84, the presence/absence of the film 11 is checked again like in step S82. When the photoelectric element 109 detects the perforation 11a or 11b, the absence of the film 11 is determined. Therefore, in order to prevent this erroneous judgment, the presence/absence of the film 11 is checked again. If the presence of the film 11 is detected, the flow advances to step S86; otherwise, the flow advances to step S85. In step S85, it is checked if the predetermined period of time has passed, i.e., the timer T has reached a time-up state. When the timer T reaches the time-up state, it is determined that the film 11 is rewound into the film cartridge 10, and the flow advances to step S87 in FIG. 18; otherwise, the flow returns to step S84.

In step S86, the timing operation of the timer T is stopped. More specifically, since the presence of the film 11 is detected in step S84, the flow returns to step S81 to check the presence/absence of the film again.

In step S87 in FIG. 18, it is checked if the counter M is "1", i.e., if the film is an unused film. If it is determined that the counter M is "1", i.e., the film is an unused film, the flow advances to step S88; otherwise, the flow advances to step S92. In step S88, the control waits until the above-mentioned switch SW2 is turned on, i.e., the drive member 21 of the camera sets the film cartridge 10 in a "1" indication state. When it is determined that the switch SW2 is ON, the flow advances to step S89, and the reverse rotation of the cartridge drive motor 24 is stopped. In step S90, the ON/OFF state of the switch SW2 is checked like in step S88. If it is determined that the switch SW2 is ON, and the film cartridge 10 is in the "1" indication state, the flow returns to the unused film routine; otherwise, the flow advances to step S91. In step S91, the reverse rotation of the cartridge drive motor 24 is started, and the flow returns to step S88.

The reason why the state of the switch SW2 is checked twice is that the drive member 21 may be undesirably moved to another position until the motor 24 is completely stopped by the step of stopping the motor (step S89) after the first decision (step S88).

Steps S92–S100 show the control process by which the spool is caused to assume a position in which the film status indicator indicates a used state (partial or total) of the film. The control circuit 101 in conjunction with the switches S3 and S4 used in performing such process constitute a first drive control means. In step S92, it is checked if the counter M is "2", i.e., if the film is a partially-used film. If YES in step S92, the flow advances to step S93; otherwise, it is determined that the film is a used film, and the flow advances to step S97. In step S93, the control waits until the above-mentioned switch SW3 is turned on, i.e., the drive member 21 of the camera sets the film cartridge 10 in a "2" indication state. When it is determined that the switch SW3 is ON, the flow advances to step S94. In step S94, the reverse rotation of the cartridge drive motor 24 is stopped. In step S95, the ON/OFF state of the switch SW3 is checked like in step S93. If it is determined that the switch SW3 is ON, and the film cartridge 10 is in the "2" indication state, the flow returns to the unused film routine; otherwise, the flow advances to step S96. In step S96, the reverse rotation of the cartridge drive motor 24 is restarted, and the flow returns to step S93.

In step S97, the control waits until the above-mentioned switch SW4 is turned on, i.e., the drive member 21 of the camera sets the film cartridge 10 in a "3" indication state. When it is determined that the switch SW4 is ON, the flow advances to step S98. In step S98, the reverse rotation of the cartridge drive motor 24 is stopped. In step S99, the ON/OFF state of the switch SW4 is checked again like in step S97. If it is determined that the switch SW4 is ON, and the film cartridge 10 is in the "3" indication state, the flow returns to the unused film routine; otherwise, the flow advances to step S100. In step S100, the reverse rotation of the cartridge drive motor 24 is restarted, and the flow returns to step S97.

The film rewinding routine has been described. Upon completion of the film rewinding routine, the unused film routine shown in FIGS. 13 and 14 is ended, and the control returns to the main program shown in FIG. 12.

Figure 20:
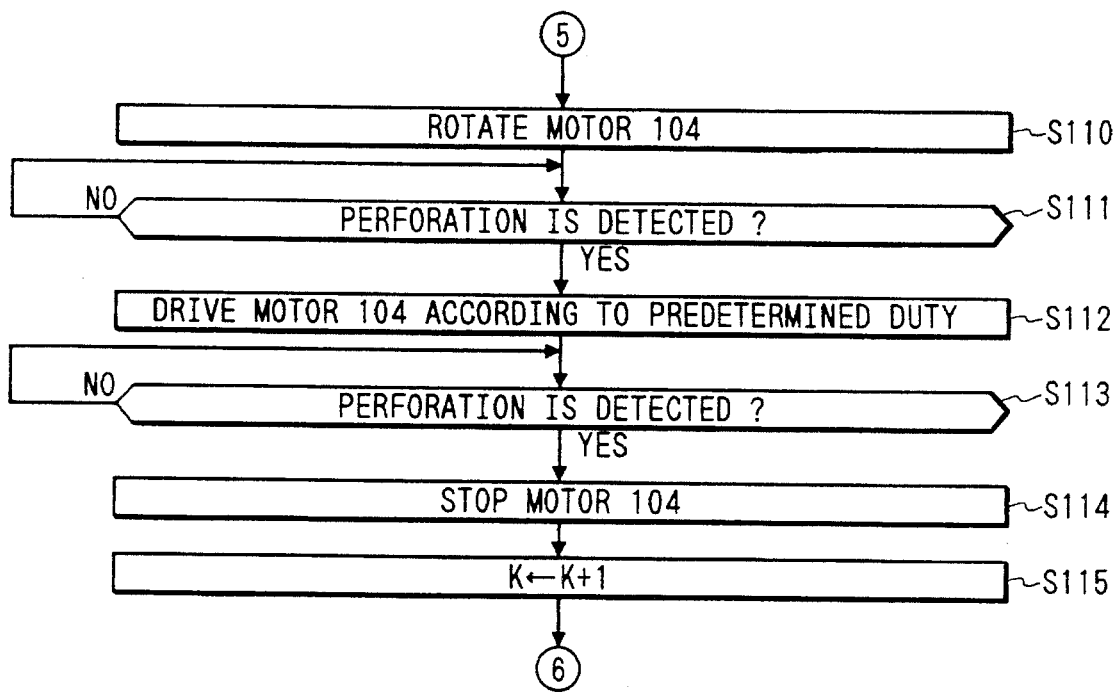
FIG. 20 is a flow chart following FIG. 19.
Figure 19:
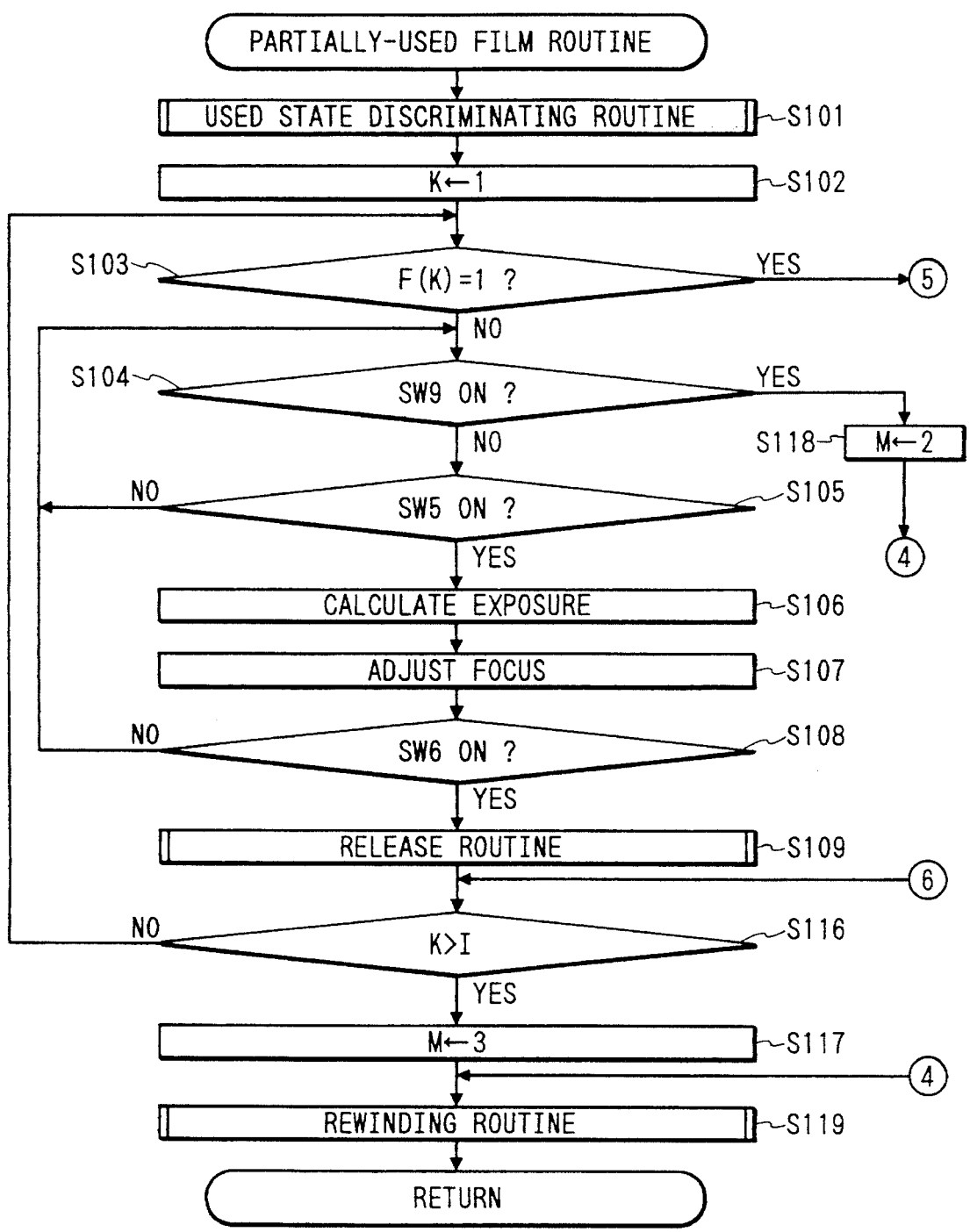
FIG. 19 is a subroutine flow chart showing a partially-used film routine.

The partially-used film routine in step S11 in FIG. 12 will be described in detail below. FIGS. 19 and 20 show this routine in detail.

Figure 21:
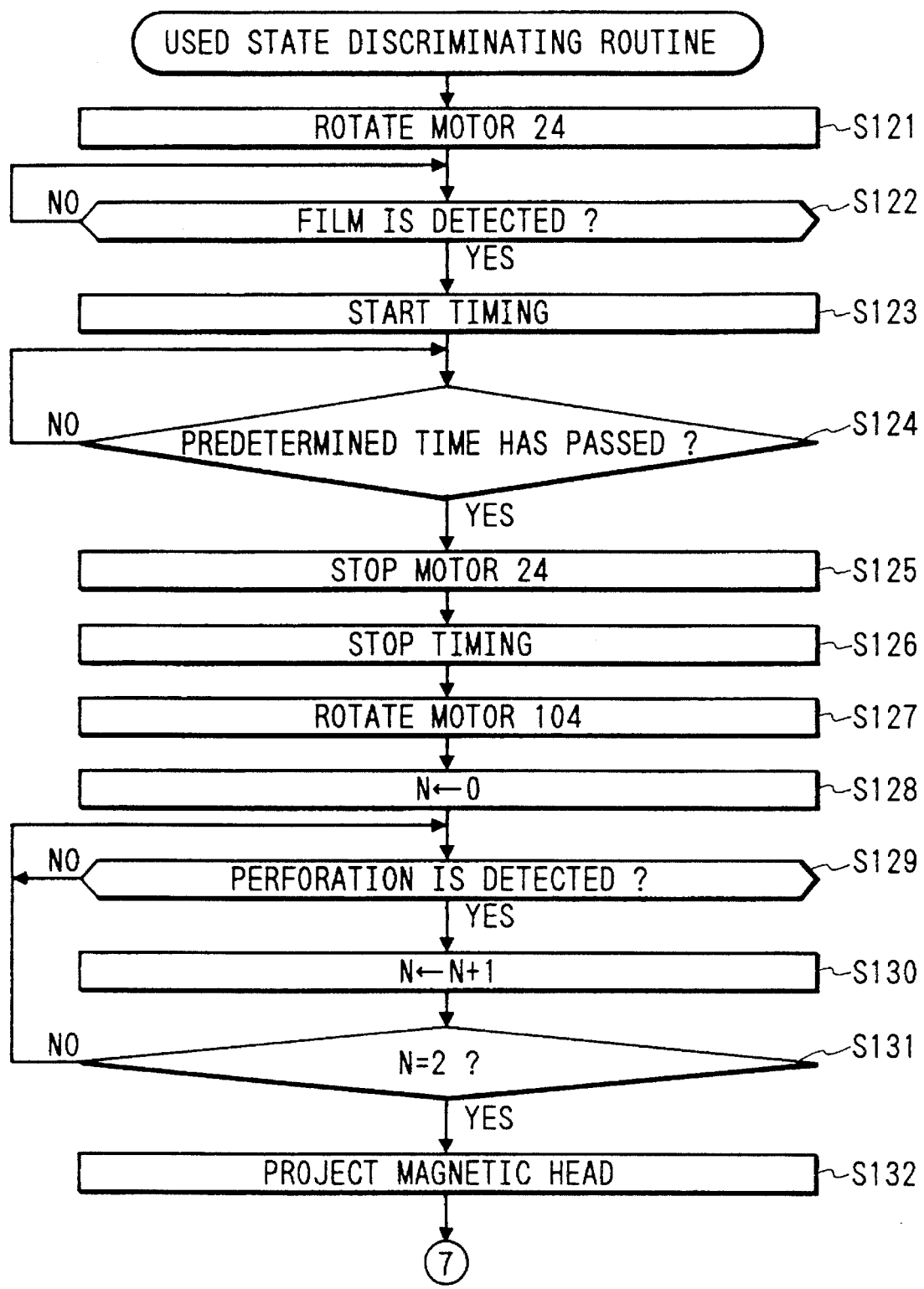
FIG. 21 is a subroutine flow chart showing in detail a used state discriminating routine.

In step S101 in FIG. 19, a routine for discriminating whether or not frames of the film 11 are exposed is performed, and FIGS. 21 to 24 show this routine in detail. Steps S121 to S126 in FIG. 21 are the same as steps S41 to S46 in the film feeding out routine in FIG. 15, and the film 11 is fed out from the film cartridge 10 to the film take-up spool 35 upon normal rotation of the cartridge drive motor 24. In step S127, the normal rotation of the film feeding motor 104 is started to start the wind-up operation of the film 11 by the take-up spool 35.

In step S128, the value of the counter N is reset to 0. The counter N is used for counting the number of perforations 11a and 11b. In step S129, the control waits until the perforation 11a or 11b is detected by the photoelectric element 109 through the photoelectric conversion circuit 108. When the perforation 11a or 11b is detected, the flow advances to step S130. In step S130, the value of the counter N is incremented, and it is checked in step S131 if the value of the counter N is 2, i.e., the perforation 11b is detected after the perforation 11a (i.e., the first frame opposes the aperture 31). If N=2, it is determined that the first frame opposes the aperture 31, and the flow advances to step S132; otherwise, the flow returns to step S129.

In step S132, the magnetic head drive device 107 drives the magnetic head 38 to project and press it against the surface of the film 11. In step S133 in FIG. 22, "1" is set in the counter K. The value of the counter K indicates the frame number of the film 11, as described above. In step S134, the value of the counter N is reset to 0, and the flag E is also reset to 0. The counter N is used for counting the number of perforations 11a and 11b, as described above, and the flag E is a flag which is set to be 1 when it is determined that exposure is completed.

In step S135, information associated with a photographing operation, and exposure completion information, which are recorded on the magnetic recording region 11c on the film 11, are reproduced through the magnetic head 38 and the reproduction circuit 106. In step S136, it is checked if the exposure completion information is detected, i.e., a pulse signal having a frequency higher than the signal frequency of the information associated with the photographing operation, or in a different frequency range, is detected. If the exposure completion information is detected, the flow advances to step S137; otherwise, the flow advances to step S138. In step S137, the flag E is set to be "1" to indicate that the corresponding frame is already exposed.

In step S138, the perforations 11a and 11b are detected like in step S129 described above. If the perforation is detected, the flow advances to step S139; otherwise, the flow returns to step S135. In step S139, the value of the counter N is incremented. In step S140, it is checked if the value of the counter N is 2, i.e., the frame position of the film 11 is advanced by one frame. If N=2, the flow advances to step S141; otherwise, the flow returns to step S135.

It is checked in step S141 if the flag E is "1", i.e., if the frame is an exposed frame. If the flag E is "1", it is determined that the frame is an exposed frame, and the flow advances to step S142; otherwise, the flow advances to step S143. In step S142, "1" is set in the flag F(K) to set that the K-th frame is an exposed frame, and the flow advances to step S144. In step S143, "0" is set in the flag F(K) to set that the K-th frame is not exposed. Note that the flag F(K) is set to be "1" when the K-th frame is an exposed frame; it is set to be "0" when the K-th frame is not an exposed frame.

In step S144, the counter K is incremented (the frame number is incremented by one). In step S145, the counter K is compared with the memory I, i.e., the frame number is compared with the number of frames of the film. If the frame number is larger than the number of frames of the film, it is determined that reproduction of information corresponding to the number of frames of the film is completed, and the flow advances to step S146; otherwise, the flow returns to step S134 to repeat steps S134 to S145. Thereafter, the flow advances to step S146 in FIG. 23.

In step S146, the magnetic head drive device 107 drives the magnetic head 38 to retract it from the film surface. In step S147, the timer T is driven to start measurement of a predetermined period of time required for slightly winding up the film 11. The predetermined period of time is slightly longer than a time required for winding up the film 11 by at least the length of one perforation 11b. In step S148, the control waits until the predetermined period of time passes, i.e., the timer T reaches a time-up state. When the timer T reaches the time-up state, the flow advances to step S149.

In step S149, the normal rotation of the film feeding motor 104 is stopped to stop the wind-up operation of the film 11. In step S150, the timing operation of the timer T is stopped. In step S151, the value of the counter K is reset to 0. In step S152, the reverse rotation of the cartridge drive motor 24 is started to start the rewinding operation of the film 11 into the cartridge 10. In step S153, the value of the counter N is reset to 0. In step S154, the control waits until the perforation 11a or 11b is detected by the photoelectric element 109 through the photoelectric conversion circuit 108. If the perforation is detected, the flow advances to step S155.

In step S155, the value of the counter N is incremented. In step S156, it is checked if the value of the counter N is 2, i.e., if the film 11 is rewound into the cartridge 10 by one frame. If N=2, it is determined that the film 11 is rewound into the cartridge 10 by one frame, and the flow advances to step S157; otherwise, the flow returns to step S154. In step S157, the value of the counter K is incremented. In step S158, the value of the counter K is compared with the value of the memory I, i.e., it is checked if the number of frames of the film 11 rewound into the cartridge 10 is larger than the number of frames of the film. If it is determined that the value of the counter K is larger than the value of the memory I, i.e., that the number of frames of the film 11 rewound into the cartridge 10 is larger than the number of frames of the film, the flow advances to step S165 in FIG. 24; otherwise, the flow returns to step S153.

In step S165, the control waits until a predetermined period of time passes to further rewind the film by about a ¼ frame or a ½ frame. The predetermined period of time is a time required for rewinding the film 11 by about a ¼ frame or a ½ frame. This is to accelerate the film 11 by slightly winding up the film 11 so as to align the stop position with that of an unused film when the position of the first frame is aligned. In step S159, the reverse rotation of the cartridge drive motor 24 is stopped to stop the rewinding operation of the film 11 into the cartridge 10. In step S160, the normal rotation of the film feeding motor 104 is started to start the wind-up operation of the film 11 by the film take-up spool 35.

In step S161, the control waits until the perforation 11a is detected by the photoelectric element 109 through the photoelectric conversion circuit 108. When the perforation 11a is detected, the flow advances to step S162. In step S162, the film feeding motor 104 begins to be driven in accordance with the predetermined duty cycle. This is to decelerate the film 11 so that the perforation 11b of the first frame can be precisely aligned with the aperture 31. In step S163, the control waits until the perforation 11b is detected, i.e., the frame position of the first frame is aligned. When the perforation 11b is detected, the flow advances to step S164. In step S164, the drive operation of the film feeding motor 104 according to the predetermined duty cycle is stopped, thereby stopping the wind-up operation of the film 11 by the film take-up spool 35. Upon completion of step S164, the used state discriminating routine is ended, and the flow returns to the processing shown in FIG. 19.

In the sequence shown in FIGS. 21 to 24 described above, whether or not all the frames of the film 11 (in this case, a partially-used film) of the loaded cartridge 10 are exposed can be confirmed.

In step S102 in FIG. 19, the value of the counter K is set to be 1, thus setting the frame number of the film 11 to be 1. In step S103, it is checked if the value of the flag F(K) is "1", i.e., a frame having a frame number K is already exposed. If it is determined that the value of the flag F(K) is "1", and the frame is already exposed, the flow advances to step S110 in FIG. 20; otherwise, the flow advances to step S104. In step S104, it is checked based on an ON/OFF state of the partial rewinding switch SW9 if the partial rewinding operation is instructed. If the partial rewinding switch SW9 is ON, the flow advances to step S118; otherwise, the flow advances to step S105.

In step S105, the ON/OFF state of the half-stroke switch SW5 is checked. If the switch SW5 is ON, the flow advances to step S106; otherwise, the flow returns to step S104. In step S106, an exposure calculation is performed, and the calculated photographic speed and aperture value are stored in the memory m. In step S107, an object distance is measured, and the photographing lens (not shown) is driven to attain an in-focus state. In step S108, the ON/OFF state of the release switch SW6 is checked. If the switch SW6 is ON, the flow advances to step S109; otherwise, the flow returns to step S104. In step S109, the above-mentioned release routine shown in FIG. 16 is performed, and the flow advances to step S116.

On the other hand, in step S110 in FIG. 20, the normal rotation of the film feeding motor 104 is started to start the wind-up operation of the film 11 by the film take-up spool 35. In step S111, the control waits until the perforation 11a is detected by the photoelectric element 109 through the photoelectric conversion circuit 108. If the perforation 11a is detected, the flow advances to step S112. In step S112, the film feeding motor 104 begins to be driven in accordance with the predetermined duty cycle. This is to decelerate the film 11, so that the perforation 11b of a photographing frame can be precisely aligned with the aperture 31.

In step S113, the control waits until the perforation 11b is detected by the photoelectric element 109 through the photoelectric conversion circuit 108. If the perforation 11b is detected, the flow advances to step S114. In step S114, the drive operation of the film feeding motor 104 according to the predetermined duty cycle is stopped, and the wind-up operation of the film 11 by the film take-up spool 35 is stopped. In step S115, the value of the counter K is incremented, and the flow advances to step S116.

Steps S110 to S115 described above are operations for feeding the film to the next frame so as not to double-expose the exposed frame.

In step S116, the value of the counter K is compared with the value of the memory I, i.e., the frame number is compared with the number of frames of the film. If the frame number is larger than the number of frames of the film, it is determined that the film 11 has become a used film, and the flow advances to step S117; otherwise, the flow returns to step S103. In step S117, "3" is set in the counter M to designate a used film, and the flow advances to step S119. In step S118, "2" is set in the counter M to designate a partially-used film, and the flow advances to S119. In step S119, the above-mentioned film rewinding routine shown in FIGS. 17 and 18 is performed, and the flow returns to step S12 in the main program shown in FIG. 12.

In step S12 in FIG. 12, it is checked based on an ON/OFF state of the lid switch SW7 if the cartridge lid (not shown) is open. If the switch SW7 is ON, it is determined that the cartridge lid is open, and the flow advances to step S13; otherwise, the control stays in step S12. In step S13, it is checked based on an ON/OFF state of the cartridge detection switch SW8 if the cartridge is unloaded from the cartridge chamber 22. If the switch SW8 is OFF, it is determined that the cartridge is unloaded, and the flow returns to step S1; otherwise, it is determined that the cartridge is not unloaded, and the flow returns to step S12. The switch SW8 in conjunction with the control circuit 101, and preferably the switch SW7, constitute an unloading detection means.

The control sequence of the camera by the control circuit 101 has been described. According to this sequence, after the cartridge 10 is unloaded from the cartridge chamber 22 of the camera 20 (after YES is determined in step S13 in FIG. 12), the flow returns to step S1, and the drive member 21 of the camera is driven to a rotational position (initial position) where the member 21 can be engaged with the engaging portion 15 of the spool 12 of the cartridge 10 indicated with "1" (unused film) by the operations in steps S1 to S4. Therefore, an unused cartridge film 10 can be easily loaded. The switch SW2 in conjunction with the control circuit 101, which performs the steps S1–S4, thus constitute a second drive control means whereby the drive member 21 is caused to assume its initial position when the unloading operation has been detected.

More specifically, according to the arrangement shown in FIG. 7, when an unused film cartridge 10 is to be loaded while the drive member 21 of the camera is located at the rotational position where the member 21 cannot be engaged with the engaging portion 15 of the cartridge 10 indicated with "1", since the drive member 21 is retracted downward against the biasing force of the spring 27A, this resistive force makes loading difficult. However, when the drive member 21 is located in a rotational phase where the member 21 can be engaged with the engaging portion 15 of the spool 12, the cartridge 10 can be easily loaded since the drive member 21 and the engaging portion 15 are engaged with each other upon loading.

In this embodiment, the drive member 21 is driven to the initial position after the cartridge is unloaded, whether or not the drive member 21 is retracted downward can be detected by the switch SW1, and the used cartridge 10 cannot be loaded. Therefore, the loaded cartridge 10 can be specified according to the detection result of the switch SW1. More specifically, if the switch SW1 is ON, a cartridge indicated with "1" (unused film) is loaded; if the switch SW1 is OFF, a cartridge indicated with "2" (partially-used film) is loaded. Since the camera disclosed in Japanese Patent Application No. 2-189994 does not drive the drive member to the initial position, the cartridge cannot be specified based on only the state of the switch SW1 when the cartridge is loaded. For this reason, when the drive member 21 and the engaging portion 15 are not engaged with each other, the drive member of the camera is rotated after the cartridge is loaded, and the rotational position upon engagement is detected by a substrate and a brush to specify a cartridge, or a cartridge is specified using an expensive photoelectric detection element. According to the arrangement of this embodiment, since the above-mentioned judgment can be made based on only the ON/OFF state of the switch SW1, as described above, control by the control circuit can be simplified, and cost can be reduced.

Note that a mechanism for blocking a loading operation of a used cartridge 10 indicated with "3" into the cartridge chamber 22 is not always required. More specifically, when a cartridge 10 indicated with "3" as a used film is loaded in the cartridge chamber 22 of the camera 20, it is determined as a cartridge 10 indicated with "2" as a partially-used film. However, the film 11 is fed out from the cartridge 10, it is determined that all the frames are already exposed, and the film 11 is automatically rewound into the cartridge 10.

Figure 22:
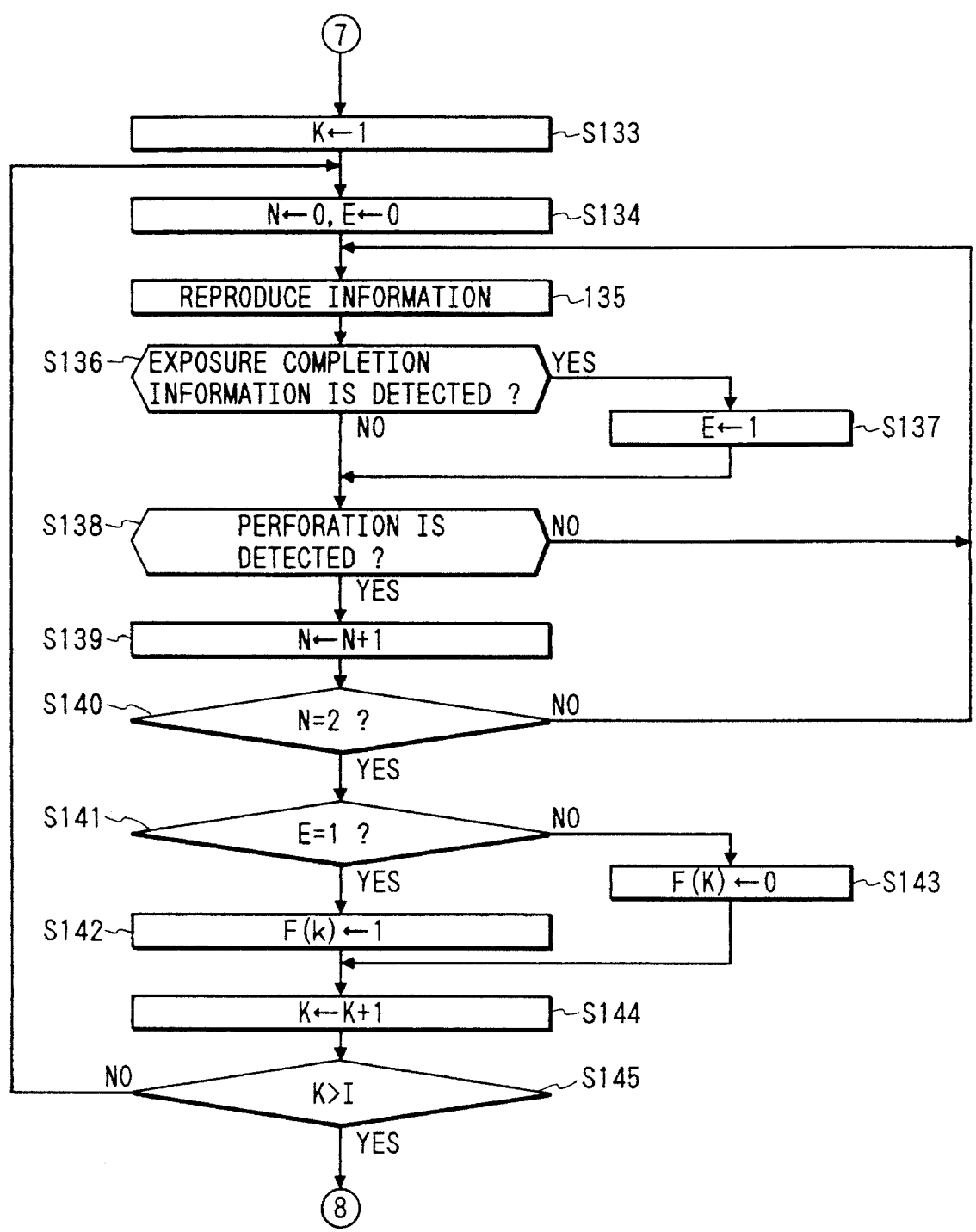
FIG. 22 is a flow chart following FIG. 21.
Figure 23:
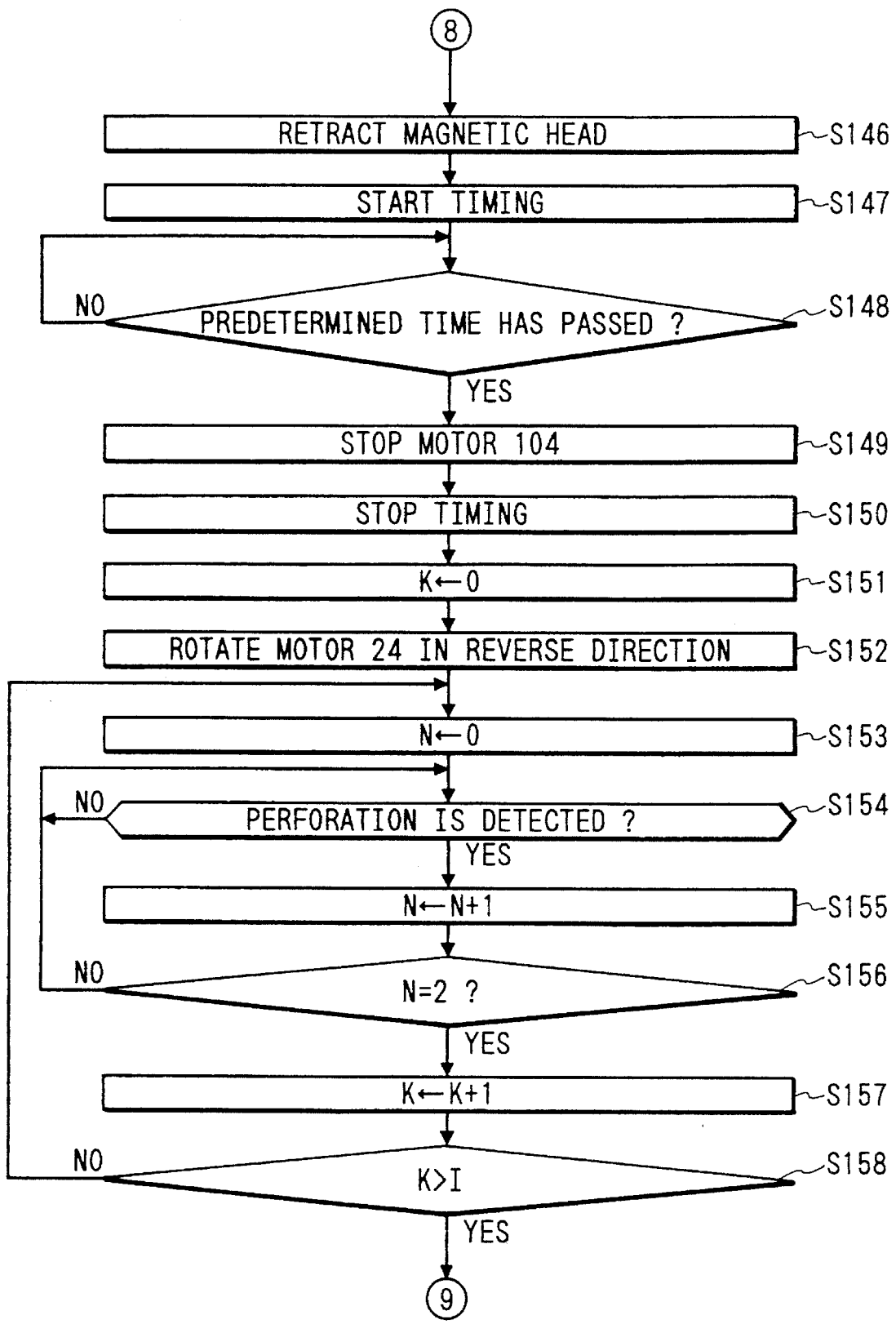
FIG. 23 is a flow chart following FIG. 22.
Figure 24:
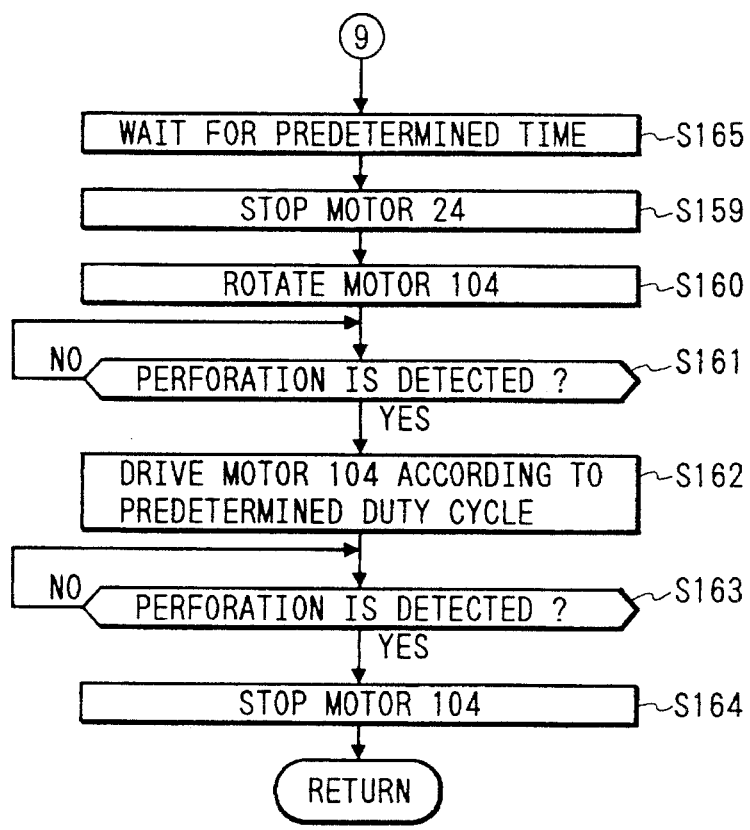
FIG. 24 is a flow chart following FIG. 23.
Figure 25:
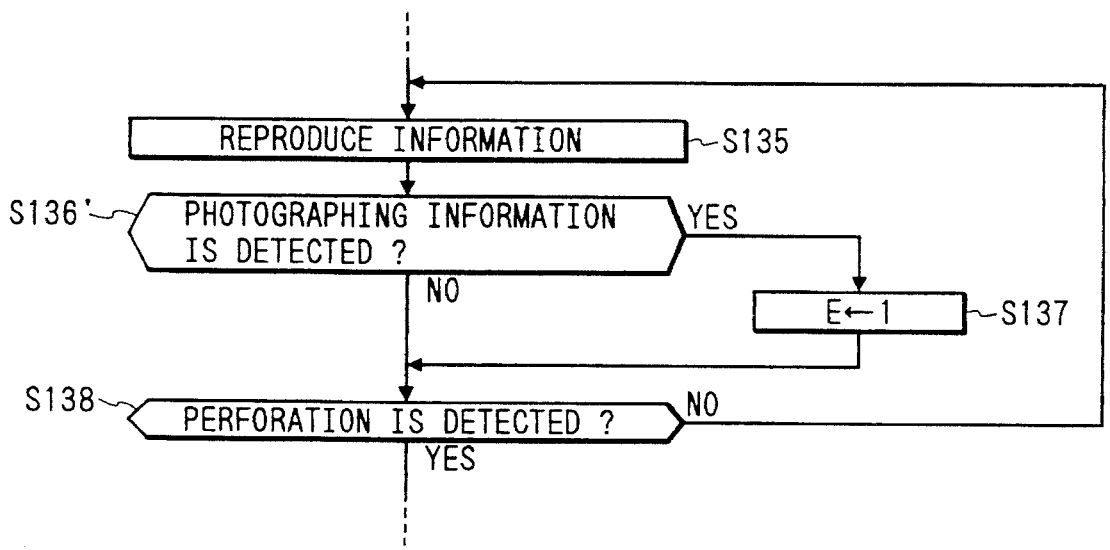
FIG. 25 is a subroutine flow chart showing a modification of the used state discriminating routine.

In the routine shown in FIG. 22, in step S136, whether or not the exposure completion information is detected is checked to determine if the corresponding frame is already exposed. However, as shown in step S136' in FIG. 25, whether or not photographing information is detected may be checked to determine if the corresponding frame is already exposed. In this case, photographing information may not be normally reproduced in a reproduction mode due to noise generated in the camera 20 or a shift in position of the magnetic head 38 with respect to the magnetic recording region 11c where the information is recorded. For this reason, it is preferable to check whether or not exposure completion information, which is not influenced by noise or a shift in position of the magnetic head 38 with respect to the magnetic recording region 11c, is detected.

According to the present invention, after an unloading operation of the cartridge is detected, since the spool drive means is driven to a rotational position where the spool drive means can be engaged with the spool of a cartridge on which a film unused state is discriminatively indicated, a new cartridge storing an unused film can be easily loaded.

According to one preferred aspect of the present invention, whether or not the spool drive means is engaged with the spool is detected upon loading of a cartridge, thereby determining if the loaded cartridge is an unused or partially-used one. For this reason, the state of a film can be determined without rotating the spool drive means upon loading of a cartridge or using an expensive photoelectric detection element. As a result, control can be simplified, and cost can be reduced.

According to another aspect of the present invention, since the loading operation of a cartridge on which a film used state is discriminatively indicated is blocked, a used film can be prevented from being erroneously loaded and being double-exposed.

What is claimed is:

1. A camera which can load a film cartridge which comprises a spool around which a film is wound, a case for rotatably storing said spool, and indication means for discriminatively indicating use states of said film according to a rotational angular position of said spool, the camera comprising:

spool drive means for engaging said spool of the cartridge only at a predetermined rotational angular position relative to said spool when the cartridge is loaded in the camera, and which can rotate said spool upon engagement;

first drive control means for controlling said spool drive means so as to rotate said spool to an angular position where said indication means indicates a used state of the film after the film is rewound;

unloading detection means for detecting an unloading operation of the film cartridge from the camera; and second drive control means for controlling said spool drive means such that when the unloading operation of the film cartridge has been detected, said spool drive means assumes a rotational angular position corresponding to said predetermined rotational angular position with the cartridge in an unused state.

2. A camera according to claim 1, further comprising detection means for detecting whether or not said spool drive means is engaged with said spool upon loading of the film cartridge, and discrimination means for discriminating based on a detection result of said detection means whether or not the film of the loaded film cartridge is in an unused state.

3. A camera according to claim 2, further comprising blocking means for blocking a loading operation of the film cartridge when a film used state is indicated by said indication means.

4. A camera according to claim 2, further comprising:

exposed frame detection means for detecting, when said discrimination means discriminates that the film of the loaded film cartridge is not in an unused state, whether or not each frame of said film is exposed; and double exposure prohibition means for prohibiting an exposed frame from being double, based on a detection result of said exposed frame detection means.

5. A camera according to claim 1, further comprising blocking means for blocking a loading operation of the film cartridge when a film used state is indicated by said indication means.

6. A loading and unloading method of a camera adapted to be loaded with a film cartridge which includes a spool around which a film is wound, a case for rotatably storing the spool, and an indicator for discriminatively indicating use states of the film according to a rotational angular position of the spool, said method comprising:

on loading the camera with the film cartridge, engaging with the spool a spool driving member pre-positioned at an engagement position corresponding to a predetermined rotational angular position of the spool with respect to the case of the film cartridge;

winding the film from the film cartridge;

rewinding the film into the film cartridge;

driving the spool to a rotational angular position where the indicator makes an indication corresponding to the use state of the film after completion of rewinding of the film;

detecting an unloading operation of the film cartridge from the camera; and when the unloading operation of the film cartridge has been detected, driving the spool driving member to said engagement position.

7. A method according to claim 6, wherein said predetermined rotational angular position is a rotational angular position at which the indicator indicates that the film is unused.

8. A method of loading a camera with a film cartridge having a spool around which a film is wound and which drivingly engages a spool driving member of the camera only at a predetermined rotational angular position relative to the spool driving member, a case for rotatably storing the spool, and an indicator for discriminatively indicating use states of the film according to a rotational angular position of the spool with respect to the case, said method comprising:

pre-positioning the spool driving member at a predetermined engagement position corresponding to a predetermined use state of the film; and loading the film cartridge in the camera with the indicator indicating said predetermined use state and the spool in said predetermined rotational angular position to engage the spool driving member with the spool.

9. A method according to claim 8, wherein said predetermined engagement position corresponds to an unused state of the film.

10. A method of unloading a camera loaded with a film cartridge which includes a spool around which a film is wound, a case for rotatably storing the spool, and an indicator for discriminatively indicating use states of the film according to a rotational angular position of the spool, comprising:

driving the spool to a rotational angular position where the indicator makes an indication corresponding to the use state of the film after completion rewinding of the film by the spool;

detecting an unloading operation of the film cartridge from the camera; and when the unloading operation of the film cartridge has been detected, driving the spool driving member to a spool engagement position corresponding to a predetermined rotational angular position of the spool with respect to the case of the film cartridge.

11. A method according to claim 10, wherein said predetermined rotational angular position is a rotational angular position at which the indicator indicates that the film is unused.

12. A cartridge loading device which can load a film cartridge which comprises a spool around which a film is wound, a case for rotatably storing said spool, and an indication device for discriminatively indicating use states of said film according to a rotational angular position of said spool, the cartridge loading device comprising:

a spool drive mechanism which engages said spool of the cartridge only at a predetermined rotational angular position relative to said spool when the cartridge is loaded in the cartridge loading device, and which can rotate said spool upon engagement;

an unloading detector which detects an unloading operation of the film cartridge from the cartridge loading device; and a drive controller which controls said spool drive mechanism so as to rotate said spool to an angular position where said indication device indicates a used state of the film after the film is rewound, and which controls said spool drive mechanism such that when the unloading operation of the film cartridge has been detected, said spool drive mechanism assumes a rotational angular position corresponding to said predetermined rotational angular position with the cartridge in an unused state.

13. A loading and unloading method of a cartridge loading device adapted to be loaded with a film cartridge which includes a spool around which a film is wound, a case for rotatably storing the spool, and an indicator for discriminatively indicating use states of the film according to a rotational angular position of the spool, said method comprising:

on loading the cartridge loading device with the film cartridge, engaging with the spool a spool driving member pre-positioned at an engagement position corresponding to a predetermined rotational angular position of the spool with respect to the case of the film cartridge;

winding the film from the film cartridge;

rewinding the film into the film cartridge;

driving the spool to a rotational angular position where the indicator makes an indication corresponding to the use state of the film after completion of rewinding of the detecting an unloading operation of the film cartridge from the cartridge loading device; and when the unloading operation of the film cartridge has been detected, driving the spool driving member to said engagement position.

14. A method of loading a cartridge loading device with a film cartridge having a spool around which a film is wound and which drivingly engages a spool driving member of the cartridge loading device only at a predetermined rotational angular position relative to the spool driving member, a case for rotatably storing the spool, and an indicator for discriminatively indicating use states of the film according to a rotational angular position of the spool with respect to the case, said method comprising:

pre-positioning the spool driving member at a predetermined engagement position corresponding to a predetermined use state of the film; and loading the film cartridge in the cartridge loading device with the indicator indicating said predetermined use state and the spool in said predetermined rotational angular position to engage the spool driving member with the spool.

15. A method of unloading a cartridge loading device loaded with a film cartridge which includes a spool around which a film is wound, a case for rotatably storing the spool, and an indicator for discriminatively indicating use states of the film according to a rotational angular position of the spool, comprising:

driving the spool to a rotational angular position where the indicator makes an indication corresponding to the use state of the film after completion of rewinding of the film by the spool;

detecting an unloading operation of the film cartridge from the cartridge loading device; and when the unloading operation of the film cartridge has been detected, driving the spool driving member to a spool engagement position corresponding to a predetermined rotational angular position of the spool with respect to the case of the film cartridge.

16. A loading method of a camera adapted to use film cartridges of a type including a spool around which a film is wound, a case for rotatably storing the spool, and an indicator for discriminatively indicating use states of the film according to a rotational angular position of the spool, said method comprising:

pre-positioning a spool drive member of the camera at a spool engagement position corresponding to a predetermined film use state, if a last used film cartridge was removed from the camera in a film use state other than said predetermined film use state; and on loading a next film cartridge in the camera, driving said spool drive member to effect engagement of said spool drive member and the spool of said next film cartridge if said next film cartridge has a film use state other than said predetermined film use state, and affecting engagement of said spool drive member and the spool of said next film cartridge without driving said spool drive member if said next film cartridge has said predetermined film use state.

17. A loading method of a cartridge loading device adapted to use film cartridges of a type including a spool around which a film is wound, a case for rotatably storing use spool, and an indicator for discriminatively indicating use states of the film according to a rotational angular position of the spool, said method comprising:

pre-positioning a spool drive member of the cartridge loading device at a spool engagement position corresponding to a predetermined film use state, if a last used film cartridge was removed from the cartridge loading device in a film use state other than said predetermined film use state; and on loading a next film cartridge in the cartridge loading device, driving said spool drive member to effect engagement of said spool drive member and the spool of said next film cartridge if said next film cartridge has a film use state other than said predetermined film use state, and affecting engagement of said spool drive member and the spool of said next film cartridge without driving said spool drive member if said next film cartridge has said predetermined film use state.

* * * * *